US012625842B2

(12) United States Patent
Cappetta et al.

(10) Patent No.: US 12,625,842 B2
(45) Date of Patent: May 12, 2026

(54) DEVICE AND METHOD FOR ON-THE-FLY PROCESSING CHAIN RECONFIGURATION IN A STREAMING BASED NEURAL PROCESSING UNIT

(71) Applicant: STMicroelectronics International N.V., Geneva (CH)

(72) Inventors: Carmine Cappetta, Battipaglia (IT); Paolo Sergio Zambotti, Milan (IT); Thomas Boesch, Rovio (CH); Giuseppe Desoli, San Fermo Della Battaglia (IT)

(73) Assignee: STMicroelectronics International N.V., Geneva (CH)

( * ) Notice: Subject to any disclaimer, the term of this patent is extended or adjusted under 35 U.S.C. 154(b) by 654 days.

(21) Appl. No.: 18/192,589

(22) Filed: Mar. 29, 2023

(65) Prior Publication Data

US 2024/0330677 A1 Oct. 3, 2024

(51) Int. Cl.
*G06F 15/78* (2006.01)
*G06F 9/38* (2018.01)
*G06N 3/08* (2023.01)

(52) U.S. Cl.
CPC ........ *G06F 15/7871* (2013.01); *G06F 9/3877* (2013.01); *G06N 3/08* (2013.01)

(58) Field of Classification Search
CPC ............................ G06F 15/7871; G06F 9/3877
See application file for complete search history.

(56) References Cited

U.S. PATENT DOCUMENTS

| | | | |
|---|---|---|---|
| 7,174,443 | B1 | 2/2007 | Vorbach et al. |
| 2018/0189641 | A1* | 7/2018 | Boesch ............... G06N 3/0464 |
| 2020/0272779 | A1 | 8/2020 | Boesch et al. |
| 2021/0263884 | A1* | 8/2021 | Nakada ................. G06N 3/063 |

FOREIGN PATENT DOCUMENTS

EP 3346425 A1 7/2018

OTHER PUBLICATIONS

Eddahech et al., "Hierarchical neural networks based prediction and control of dynamic reconfiguration for multilevel embedded systems," Journal of Systems Architecture, vol. 59, Issue 1, Jan. 2013, pp. 48-59.
Thinh et al., "High-performance anomaly intrusion detection system with ensemble neural networks on reconfigurable hardware," Concurrency Computat Pract Exper. 2021, 11 pages.

(Continued)

*Primary Examiner* — Courtney P Spann
(74) *Attorney, Agent, or Firm* — Seed Intellectual Property Law Group LLP

(57) ABSTRACT

A neural network is able to reconfigure hardware accelerators on-the-fly without stopping downstream hardware accelerators. The neural network inserts a reconfiguration tag into the stream of feature data. If the reconfiguration tag matches an identification of a hardware accelerator, a reconfiguration process is initiated. Upstream hardware accelerators are paused while downstream hardware accelerators continue to operate. An epoch controller reconfigures the hardware accelerator via a bus. Normal operation of the neural network then resumes.

20 Claims, 16 Drawing Sheets

(56)     References Cited

OTHER PUBLICATIONS

Zhou et al., "NeuroMapper: In-browser Visualizer for Neural Network Training," Oct. 22, 2022, 2 pages <<URL: https://arxiv.org/abs/2210.12492>>.

Singh, "Analysis of Efficient Neural Architecture Search via Parameter Sharing," Master's Thesis, University of Tartu, Institute of Computer Science, Tartu, Estonia, 2019, 43 pages <<URL: https://comserv.cs.ut.ee/home/files/Singh_Computerscience_2019.pdf?study=ATILoputoo&reference=FA5D44DB9143980BF34805378E72F0E6B1C2405C>>.

Abarajithan et al., "Kraken: An Efficient Engine with a Uniform Dataflow for Deep Neural Networks," Dec. 6, 2021, 14 pages <URL= https://doi.org/10.48550/arXiv.2112.02793>.

* cited by examiner

123

124

124

124

108

HARDWARE ACCELERATOR

144 — CONTROL LOGIC

142 — FLAG

130 — INPUT BUFFER

132 — OUTPUT BUFFER

134 — REGISTERS

140 — RECONFIGURATION TAG

IDENTIFICATION DATA

136 — CONFIGURATION DATA

138

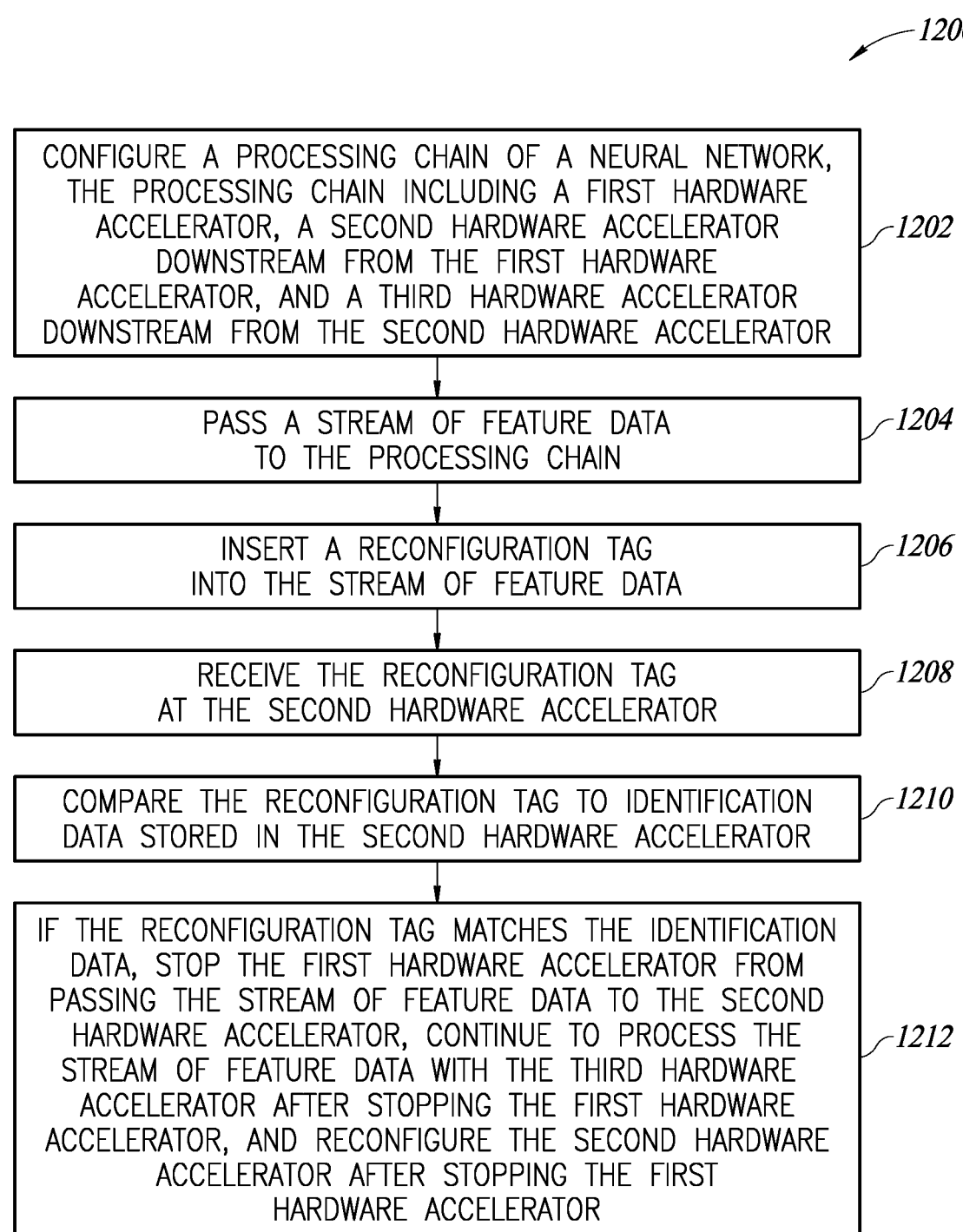

CONFIGURE A PROCESSING CHAIN OF A NEURAL NETWORK, THE PROCESSING CHAIN INCLUDING A FIRST HARDWARE ACCELERATOR, A SECOND HARDWARE ACCELERATOR DOWNSTREAM FROM THE FIRST HARDWARE ACCELERATOR, AND A THIRD HARDWARE ACCELERATOR DOWNSTREAM FROM THE SECOND HARDWARE ACCELERATOR — 1202

PASS A STREAM OF FEATURE DATA TO THE PROCESSING CHAIN — 1204

INSERT A RECONFIGURATION TAG INTO THE STREAM OF FEATURE DATA — 1206

RECEIVE THE RECONFIGURATION TAG AT THE SECOND HARDWARE ACCELERATOR — 1208

COMPARE THE RECONFIGURATION TAG TO IDENTIFICATION DATA STORED IN THE SECOND HARDWARE ACCELERATOR — 1210

IF THE RECONFIGURATION TAG MATCHES THE IDENTIFICATION DATA, STOP THE FIRST HARDWARE ACCELERATOR FROM PASSING THE STREAM OF FEATURE DATA TO THE SECOND HARDWARE ACCELERATOR, CONTINUE TO PROCESS THE STREAM OF FEATURE DATA WITH THE THIRD HARDWARE ACCELERATOR AFTER STOPPING THE FIRST HARDWARE ACCELERATOR, AND RECONFIGURE THE SECOND HARDWARE ACCELERATOR AFTER STOPPING THE FIRST HARDWARE ACCELERATOR — 1212

FIG. 12

DEVICE AND METHOD FOR ON-THE-FLY PROCESSING CHAIN RECONFIGURATION IN A STREAMING BASED NEURAL PROCESSING UNIT

BACKGROUND

Technical Field

The present disclosure generally relates to neural networks, and more particularly to configuration of neural networks.

Description of the Related Art

Deep learning algorithms promote very high performance in numerous applications involving recognition, identification and/or classification tasks, however, such advancements may come at the price of significant usage of processing power. Thus, their adoption can be hindered by a lack of availability of low-cost and energy-efficient solutions. Accordingly, severe performance specifications may coexist with tight constraints in terms of power and energy consumption while deploying deep learning applications on embedded devices.

Convolutional Neural Networks (CNN) are a type of Deep Neural Networks (DNN). Their architecture is characterized by Convolutional Layers and Fully Connected Layers. The former layers carry on convolution operations between layer's inputs and convolutional kernels, non-linear activation functions (such as rectifiers) and max pooling operations, which are usually the most demanding ones in terms of computational effort.

Furthermore, reconfiguring components of neural networks can be costly in terms of time and resources.

BRIEF SUMMARY

Embodiments of the present disclosure provide a method and device that enables on-the-fly reconfiguration of hardware accelerators of a neural network. In one embodiment, while a processing chain of the neural network is operating, a reconfiguration tag is inserted into the stream of feature data being processed. Each of the hardware accelerators of the processing chain receives the reconfiguration tag in turn. If the reconfiguration tag matches an identifier stored in a hardware accelerator, then a reconfiguration process is initiated. Processing of feature data upstream from the matched hardware accelerator is paused while hardware accelerators downstream continue to process feature data already in the chain. An epoch controller then reconfigures the matched hardware accelerator via a bus separate from the chain. Flow of the feature data is then resumed. The result is that one or more of the hardware accelerators can be reconfigured on-the-fly without entirely emptying the processing chain of feature data.

In one embodiment, a method includes passing a stream of feature data to a processing chain of a neural network. The processing chain includes a first hardware accelerator. The method includes storing first identification data in the first hardware accelerator, inserting, into the stream of feature data, a reconfiguration tag, and receiving the reconfiguration tag with the first hardware accelerator. The method includes checking if the reconfiguration tag matches the first identification data and if the reconfiguration tag matches the first identification data, initiating a reconfiguration process of the first hardware accelerator.

In one embodiment, a method includes configuring a processing chain of a neural network. The processing chain includes a first hardware accelerator, a second hardware accelerator downstream from the first hardware accelerator, and a third hardware accelerator downstream from the second hardware accelerator. The method includes passing a stream of feature data to the processing chain, inserting a reconfiguration tag into the stream of feature data, receiving the reconfiguration tag at the second hardware accelerator, and comparing the reconfiguration tag to identification data stored in the second hardware accelerator. The method includes, if the reconfiguration tag matches the identification data, stopping the first hardware accelerator from passing the stream of feature data to the second hardware accelerator, continuing to process the stream of feature data with the third hardware accelerator after stopping the first hardware accelerator, and reconfiguring the second hardware accelerator after stopping the first hardware accelerator.

In one embodiment, a device includes a neural network. The neural network includes a stream switch, a plurality of hardware accelerators configured as a processing chain of the neural network in conjunction with the stream switch, and stream engine. The stream engine is configured to pass a stream of feature data to the plurality of hardware accelerators and to insert a reconfiguration tag into the stream of feature data. At least one of the hardware accelerators includes a register configured to store identification data, to compare the reconfiguration tag to the identification data, and to initiate a reconfiguration process of the at least one hardware accelerator if the reconfiguration tag matches the identification data.

BRIEF DESCRIPTION OF THE SEVERAL VIEWS OF THE DRAWINGS

FIG. 12 is a flow diagram of a method for operating a neural network, according to some embodiments.

DETAILED DESCRIPTION

Figure 1:
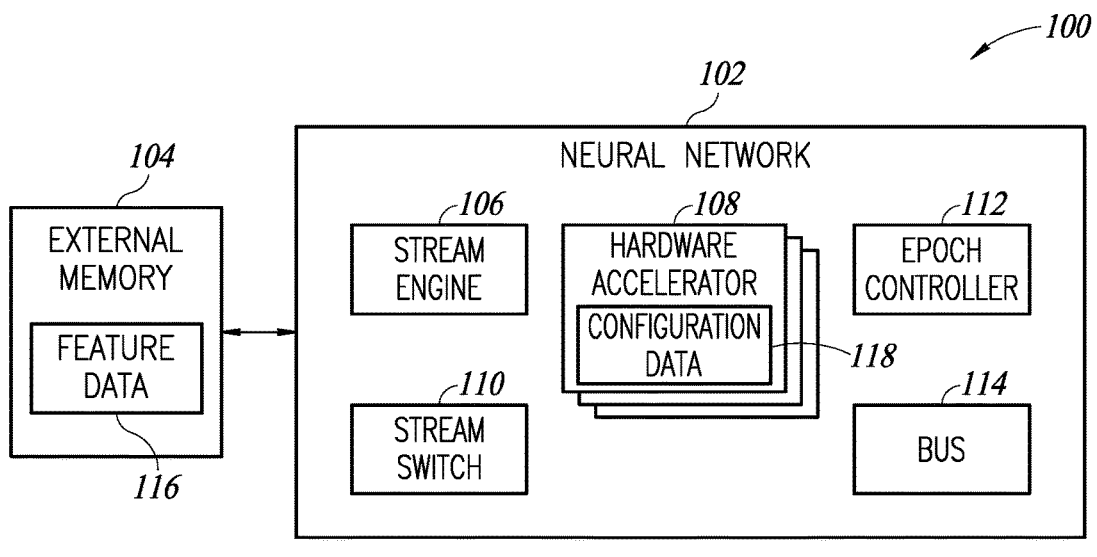
FIG. 1 is a block diagram of an electronic device, according to some embodiments.

FIG. 1 is a block diagram of an electronic device 100, according to some embodiments. The electronic device 100 includes a neural network 102 and an external memory 104. The external memory 104 includes feature data 116 for processing by the neural network 102. The neural network 102 includes a stream engine 106, hardware accelerators 108, a stream switch 110, an epoch controller 112, and a bus 114. The neural network 102 receives the feature data 116 from the external memory 104 and generates prediction data based on the feature data 116. As will be set forth in more detail below, the components of the neural network 102 cooperate to provide on-the-fly reconfiguration of the hardware accelerators 108.

In one embodiment, the feature data 116 is generated by an image sensor (not shown) or another type of sensor of the electronic device 100. Accordingly, the feature data 116 can include image data corresponding to one or more images captured by the image sensor. The image data is formatted so that it can be received by the neural network 102. The neural network 102 analyzes the feature data 116 and generates prediction data. The prediction data indicates a prediction or classification related to one or more aspects of the image data. The prediction data can correspond to recognizing shapes, objects, faces, or other aspects of an image. While some embodiments herein describe that feature data 116 is received from a sensor or sensor system, the feature data 116 can be received from other types of systems or devices without departing from the scope of the present disclosure. For example, the feature data 116 may include a data structure stored in a memory and containing statistical data collected and stored by an external CPU. Other types of feature data 116 can be utilized without departing from the scope of the present disclosure. The components of the neural network 102 may be implemented on a single integrated circuit die as an application specific integrated circuit (ASIC).

While some examples herein describe a neural network 102 implemented in conjunction with an image sensor, the neural network 102 may be implemented in conjunction with other types of sensors without departing from the scope of the present disclosure, or various combinations of types of sensors. Additionally, the neural network 102 may process data other than sensor data without departing from the scope of the present disclosure. Furthermore, machine learning networks or processes other than neural networks can be utilized without departing from the scope of the present disclosure.

In one embodiment, the neural network 102 is trained with a machine learning process to recognize aspects of training images that are provided to the neural network 102. The machine learning process includes passing a plurality of training images with known features to the neural network 102. The machine learning process trains the neural network 102 to generate prediction data that accurately predicts or classifies the features of the training images. The training process can include a deep learning process.

The neural network 102 includes a plurality of hardware accelerators 108. The hardware accelerators correspond to hardware circuits or hardware units that collectively perform the function of the neural network 102. The hardware accelerators 108 can include convolution accelerators, activation units, pooling units, multiply and accumulate (MAC) units, decompression units, and other types of units.

In the example of a convolutional neural network, each convolution accelerator is the hardware block that implements the convolution operations corresponding to a convolution layer of the neural network 102. Each pooling unit is a hardware block that implements pooling functions between the convolution layers. Each MAC unit is a hardware accelerator that performs multiply and accumulate operations on the feature data. The convolution units 106, the activation units 108, and the pooling units 110 cooperate in generating prediction data from the feature data 116.

The stream engine 106 receives the feature data 116 from the external memory 104 and provides the feature data 116 to the stream switch 110. The stream switch 110 is a switch, or series of switches that directs the flow of data within the neural network 102. In general, when data is provided from one component of the neural network 102 to another component, the data passes through the stream switch between the components. Accordingly, a processing chain of the neural network 102 may be set up by configuring the stream switch 104 to provide data between components.

A layer of the neural network is set up by programming the stream switch 110 to connect different hardware accelerators 108 of the neural network in a processing chain. In one example, a processing chain can include a convolution accelerator, a pooling unit downstream from the convolution accelerator, an arithmetic operator (such as a MAC unit) downstream from the pooling unit, and an activation unit downstream from the arithmetic operator. Such a processing chain may correspond to a layer of the neural network. Data passes through the stream switch between each component of the chain.

During implementation of a layer of the neural network, feature data 116 is provided to the stream engine 106. The stream engine 106 provides the feature data to the processing chain. The feature data 116 flows through each hardware accelerator 108 of the processing chain. Each hardware accelerator 108 performs operations on the feature data 116 and provides the feature data to the next hardware accelerator 108 of the processing chain. At the end of the processing chain, the feature data 116 is passed back to the stream engine 106. The process feature data 116 is then provided to the external memory 104. The processed feature data 116 may then be passed back to the neural network 102 for further processing by another layer of the neural network.

Each individual hardware accelerator 108 of the processing chain is programmed to operate in a specific manner. In particular, each hardware accelerator 108 includes one or more configuration registers that store the configuration data 118 for the hardware accelerator 108. The configuration data 118 determines the specifics of the operations that will be performed by the hardware accelerator 108. The configuration data 118 of a convolution accelerator may program the convolution accelerator to do convolutions with specific dimensions (3×3, 5×5, etc.). The configuration data 118 of a hardware accelerator 108 may indicate the number of output channels of the hardware accelerator 108. The configuration data 118 may indicate a number of output channels of a hardware accelerator 108. The configuration data 118 of a pooling unit may indicate pooling window sizes, strides lengths, or other aspects of the pooling unit. Accordingly, for a given processing chain, each hardware unit 108 includes configuration data 118 that indicates what the hardware unit 108 will be doing.

The epoch controller 112 may control the configuration of the hardware units 108 for a given epoch. Processing by the neural network 102 may be accomplished in a series of epochs. An epoch may correspond to a layer of the neural network. Accordingly, a specific processing chain may be implemented for a specific epoch of the neural network processing. In some cases, it is beneficial to split a layer into multiple epochs. The epoch controller 112 may program a specific epoch and then run the epoch for a number of cycles (e.g., millions of cycles) specified for the epoch.

In one potential solution, in order to change an epoch, the entire processing chain is flushed of feature data so that the processing chain is empty. The processing chain can then be reprogrammed and restarted. Reprogramming of the processing chain corresponds to the reconfiguring one or more hardware accelerators of the processing chain with new configuration data. However, such a reconfiguration process has serious drawbacks. In particular, it is both time-consuming and resource intensive to flush the entire processing chain and then to restart the processing chain.

Before providing additional details about reconfiguration, it may be beneficial to discuss some aspects of some types of hardware accelerators 108. In one embodiment, a convolution accelerator is a hardware accelerator that performs convolution operations on feature data provided to the convolution accelerator. The feature data is generated from the feature data 116. The convolution operations at a convolution layer convolve the feature data with kernel data generated during the machine learning process for the neural network 102. The convolution operations result in feature data that is changed in accordance with the kernel data. The kernel data can include a plurality of kernels a particular sizes (e.g. numbers of rows and columns). Each kernel is convolved with a portion of the feature data corresponding to the size of the current. The configuration data of the convolution accelerator indicates the operational parameters of the convolution accelerator.

The data from the convolution unit may be provided to an activation unit. The activation unit performs activation operations on the data from the convolution unit. The activation operation can include performing nonlinear operations on data values received from the convolution unit. One example of an activation operation is a rectified linear unit (ReLU) operation. Other types of activation operations can be utilized without departing from the scope of the present disclosure. The configuration data of the activation unit indicates the operational parameters of the activation unit The pooling unit may receive feature data from the activation unit. The pooling unit performs pooling operations on the feature data received from the activation unit. Pooling operations are performed on the feature data to prepare the feature data for the convolution operations of the next convolution layer. The pooling unit performs the pooling operations between convolution layers. The pooling unit is used to accelerate convolutional neural network operations. The pooling unit can perform max pooling operations, minimum pooling operations, average pooling operations, or other types of pooling operations. The configuration data of the pooling unit indicates the operational parameters of the pooling unit.

Returning to the concept of reconfiguration, in one example, a CNN implements a convolution layer that includes performing 3×3 convolution operations for a first portion of the layer and then performing 5×5 convolution operations for a second portion of the layer. In order to change from 3×3 convolution operations to 5×5 convolution operations, both the convolution accelerator and a MAC unit may need to be reconfigured. Furthermore, other hardware units of the processing chain may also be reconfigured. This corresponds to a reconfiguration. Anytime a hardware accelerator 108 performs a different operation or set of operations, a reconfiguration may be performed.

The epoch controller 112 is coupled to the hardware units 108 by a bus 114. The bus 114 operates outside the stream flow of the feature data 116 of the processing chain. Whereas the feature data flows in a stream through the stream switch 110 between each hardware unit 108 of the chain, data can be provided by the bus 114 to each hardware unit 108 outside of the stream without using the stream switch 110. Accordingly, the bus 114 may correspond to a set of data paths, metal interconnections, or other circuitry that communicatively couples the hardware accelerators 108 to the epoch controller 112. The bus 114 may also connect other components of the neural network 102.

In the potential solution described above, reconfiguration is accomplished entirely via the bus 114. In particular, the epoch controller 112 stops the hardware accelerators 108 and then reconfigures them via the bus 114. However, embodiments of the present disclosure enable reconfiguration to be done in a much more effective and efficient manner by utilizing both the bus 114 and the stream flow of the processing chain, as will be set forth in more detail below.

In one embodiment, the epoch controller, via the stream engine 106 can insert one or more reconfiguration tags into the stream of the feature data 116. The one or more reconfiguration tags are passed in sequence through the hardware accelerators 108 of the process chain. Each hardware accelerator 108 may include identification data in a register. If the reconfiguration tag matches the identification data, then the hardware accelerator may signal the epoch controller 108 via the bus that a reconfiguration match has occurred. The epoch controller 112 pauses each of the hardware accelerators upstream from the hardware accelerator that matched with the tag such that new feature data is not provided into the processing chain. The matched hardware accelerator 108 continues to process the remaining feature data that has already been received. The hardware accelerators 108 downstream from the matched hardware accelerator continue to process feature data that is already in the processing chain. When the matched hardware accelerator has processed all the remaining feature data, the epoch controller 112 writes new configuration data to the matched hardware accelerator 108 via the bus 114. After the matched hardware accelerator 108 has been reconfigured, the epoch controller resumes the flow of data into the processing chain. In this way, a hardware accelerator 108 can be reconfigured without emptying the processing chain of data. This greatly reduces the time and processing resources utilized in reconfiguring hardware accelerators 108.

Another benefit of performing reconfiguration in this manner is that multiple hardware accelerators 108 can be reconfigured in series. As the one or more reconfiguration tags flow through the processing chain, they will arrive at each hardware accelerator 108 in a same sequence as a processing chain dictates. Accordingly, a first hardware accelerator 108 may receive and match with a reconfiguration tag and may be reconfigured. The reconfiguration tag will then arrive at the next hardware accelerator 108. If there is a match, then the next hardware accelerator 108 will be reconfigured as described above. This can continue in sequence until all hardware accelerators 108 have been reconfigured without entirely stopping the processing chain.

In one embodiment, the identification data can correspond to a unique identification of the hardware accelerator 108. The unique identification may be written to a read only register of the hardware accelerator 108. Accordingly, if a particular hardware accelerator 108 is to be reconfigured, then a reconfiguration tag including the unique identification of the hardware accelerator 108 can be inserted into the stream of feature data. When the reconfiguration tag arrives at the hardware accelerator, the reconfiguration tag will be matched to the unique identification and the hardware accelerator can be reconfigured.

In one embodiment, the identification tag is not a unique identification of the hardware accelerator 108, but a type of reconfiguration identification that can be written to the hardware accelerator 108 by the epoch controller 112 via the bus 114. If the hardware accelerator 108 is to be reconfigured, then the epoch controller 112 inserts the reconfiguration tag matching the reconfiguration identification of the hardware accelerator 108 to be reconfigured and reconfiguration can occur as described above upon matching. This may be beneficial in that multiple hardware accelerators may include a same reconfiguration identification so that a single reconfiguration tag can be utilized to cause the reconfiguration of multiple hardware accelerators 108 in turn.

In one embodiment, each hardware accelerator 108 can include a different reconfiguration identification written by the epoch controller 112. The epoch controller 112 can then insert reconfiguration tags successively into the stream of feature data so that reconfiguration of hardware accelerators 108 will occur one after the other with different reconfiguration tags. Various other schemes can be utilized to reconfigure hardware accelerators 108 on-the-fly with reconfiguration tags or other types of data inserted into the stream of feature data without departing from the scope of the present disclosure.

Figure 2A:
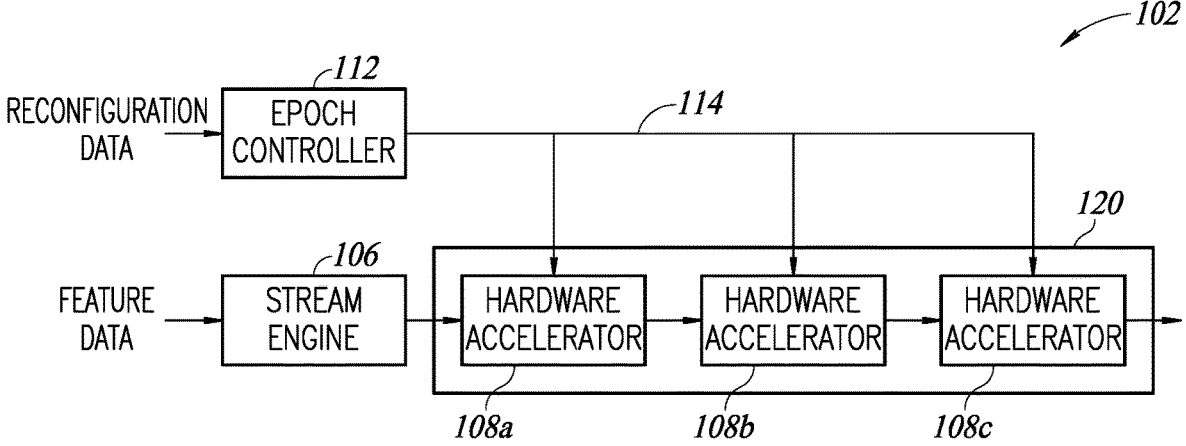
FIG. 2A is a block diagram of a neural network illustrating a process chain, according to some embodiments.

FIG. 2A is a block diagram of a portion of the neural network 102, according to some embodiments. FIG. 2A illustrates a stream engine 106 and epoch controller 108, and three hardware accelerators 108*a*, 108*b*, and 108*c*. The three hardware accelerators 108*a*-*c* have been configured in a processing chain 120. While three hardware accelerators 108 are shown in FIG. 2A, in practice, a processing chain 120 can have fewer or more hardware accelerators 108 than three. Throughout the description, the generic reference number 108 may be used without suffix a, b, or c when speaking about hardware accelerators in general. When a particular hardware accelerator is referenced, the reference number 108 may include the suffix a, b, or c.

The feature data is provided to the stream engine 106 and from the stream engine 106 to the processing chain 120 via the stream switch 110. The feature data then flows through each of the hardware accelerators 108 of the processing chain 120 in turn. The epoch controller 112 is also coupled to each of the hardware accelerators 108 by the bus 114. As described in relation to FIG. 1, the epoch controller 112 can write configuration data for each of the hardware accelerators 108. The epoch controller 112 can also write identification data to the hardware accelerators 108. The epoch controller 112, can also insert reconfiguration tags into the feature data via the stream engine 106 or in another manner. A reconfiguration tag can initiate a reconfiguration process of a hardware accelerator 108 if the reconfiguration tag matches the identification data stored in the hardware accelerator 108. When a match occurs, the epoch controller 112 can write reconfiguration data to the hardware accelerator.

In an example in which the hardware accelerator 108*b* is to be reconfigured, a reconfiguration tag is inserted into the stream of feature data 116. When the hardware accelerator 108*b* receives the reconfiguration tag, the hardware accelerator 108*b* compares the reconfiguration tag to the identification data stored by the hardware accelerator 108*b*. Because the reconfiguration tag matches the identification data stored by the hardware accelerator 108*b*, a reconfiguration process is initiated for the hardware accelerator 108*b*. The reconfiguration process includes pausing the hardware accelerator 108*a*, and more particularly, pausing the flow of the feature data into the hardware accelerator 108*a*. The hardware accelerator 108*b* continues to process any feature data remaining in the hardware accelerator 108*b* after reception of the reconfiguration tag. The hardware accelerator 108*c* is not stopped and continues to process any feature data received from the hardware accelerator 108*b*.

When the hardware accelerator 108*b* has processed all of the previously received feature data, the hardware accelerator 108*b* can raise a flag. The flag can indicate that the hardware accelerator 108*b* has processed all feature data and is ready for reconfiguration. The epoch controller 112 can then write new configuration data to the hardware accelerator 108*b*. After writing new configuration data to the hardware accelerator 108*b*, the hardware accelerator 108*a* can be resumed and the flow of feature data into the hardware accelerator 108*a* can be resumed.

Figure 2B:
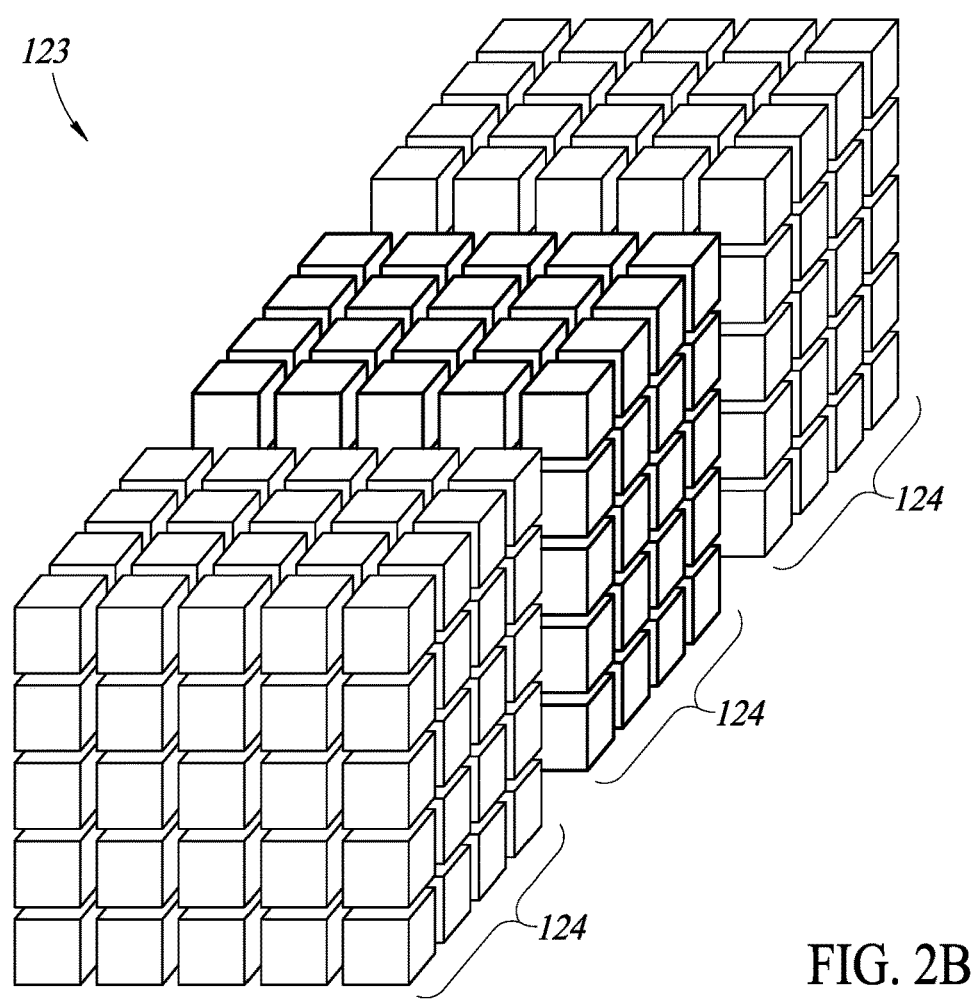
FIG. 2B is a representation of a feature tensor, according to some embodiments.

FIG. 2B is a representation of a feature tensor 123, according to one embodiment. In one embodiment, the feature data 116 is stored in the external memory 104 as a feature tensor 123. Accordingly, the neural network 102 utilizes tensor data structures for the feature data. The feature data 116 is passed to the processing chain 120 as tensor data. Each hardware accelerator 108 may receive the feature data in a tensor form, may process the feature data, and may provide the processed feature data in a tensor form to the next hardware accelerator 108.

Tensors are similar to matrices in that they include a plurality of rows and columns with data values in the various data fields. A convolution operation generates an output tensor of the same dimensions as the input tensor, though with different data values. An activation operation generates an output tensor of the same dimensions as the input tensor, though with different data values. A pooling operation may generate an output tensor of reduced dimensions compared to the input tensor.

The feature tensor 123 includes a plurality of blocks. Each of these blocks represents a data value. The feature tensor 123 is divided into a plurality of batches 124. The tensor 123 includes height, width, and depth, as the individual batches 124. While the feature tensor 123 of FIG. 4 illustrates a 5×5×5 tensor, in practice, the feature tensor 123 may include other height, width, and depth dimensions. The feature tensor 123 may be provided as batches 124 due to the large size of the feature tensor 123. Each batch may be considered a sub-tensor of the feature tensor 123. The entire feature tensor 123 may be provided to a single processing chain 120 or layer. In some cases, a single epoch may correspond to the entire layer. In other cases, as described above, a single tensor data 123 may be processed in multiple epochs.

In one example, a final batch 124 may have different dimensions than the previous batches. In order for the processing chain 120 to process the final batch 124, one or more hardware accelerators 108 of the processing chain 120 may need to be reconfigured. Accordingly, a reconfiguration tag may be inserted at the beginning of the final batch, or at the end of the second to last batch, in order to initiate reconfiguration of any hardware accelerators 108 that need to be reconfigured prior to processing of the final batch. Embodiments of the present disclosure, as described herein, enable the reconfiguration of hardware accelerators 108 without stopping and emptying the entire processing chain 120.

In one embodiment, during the various convolution, activation, pooling, and requantization operations, the feature tensor 123 is divided into batches 124. The feature tensor 123 may be batched by height, width, or depth. Convolution, activation, pooling, and requantization operations are performed on the batches from the feature tensor.

Figure 3:
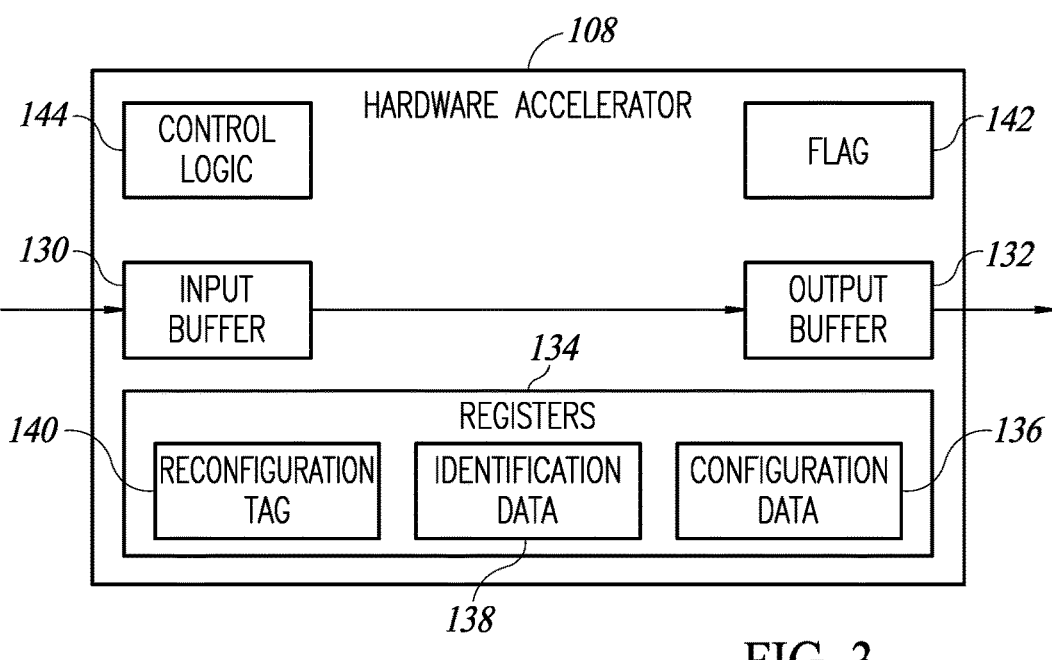
FIG. 3 is a block diagram of a hardware accelerator, according to some embodiments.

FIG. 3 is a block diagram of the hardware accelerator 108, according to one embodiment. The hardware accelerator 108 could be a convolution accelerator, a pooling unit, a MAC unit, an activation unit, or another type of hardware accelerator. The hardware accelerator 108 includes an input buffer 130 and an output buffer 132.

The stream of feature data 116 is received at the input buffer 130. The feature data 116 is passed from the input buffer 130 through processing circuitry (not shown), and to the output buffer 132. The output buffer 132 then outputs the processed feature data 116 to a next hardware accelerator 108 of the processing chain 120. In the example of a convolution accelerator, the processing circuitry can correspond to the circuitry that performs the convolution operations on the feature data 116.

The hardware accelerator 108 includes registers 134. The registers 134 include one or more registers 136 that configuration data. The registers 134 include one or more registers 138 that store identification data. The configuration data corresponds to the data that controls the operation of the hardware accelerator 108. During reconfiguration, the configuration data is rewritten or otherwise adjusted.

The identification data corresponds to the identification utilized to match with reconfiguration tag data received with the feature data in order to determine whether or not reconfiguration process should be initiated. As described previously, the identification data can correspond to a unique identification of the hardware accelerator 108 stored in a read only a portion of the registers 134. Alternatively, the identification data can correspond to rewritable reconfiguration identity that can be written by the epoch controller 112 via the bus 114 to assist in initiating a reconfiguration process.

The registers 134 may also include a register 140 that stores a reconfiguration tag. The reconfiguration tag may also be called a reconfiguration label. When a reconfiguration tag is received at the input buffer 130 with the stream of feature data 116, the reconfiguration tag is passed the register 140. The reconfiguration tag is then compared to the identification data. If the reconfiguration tag matches the identification data, then reconfiguration process may be initiated.

The hardware accelerator 108 may include control logic 144. The control logic 144 may control the operation of the hardware accelerator 108 in conjunction with the configuration data. In one embodiment, when a reconfiguration tag is received and stored in the register 140, the control logic 144 compares the identification data to the reconfiguration tag in order to determine whether a reconfiguration process should be initiated. If a match occurs, then the control logic 144 may initiate the reconfiguration process.

In one embodiment, the hardware accelerator 108 includes a flag 142. In practice, the flag 142 may be part of the registers 134 or may be separate from the registers 134. When a reconfiguration process is initiated, the control logic

144 may check to determine whether there is still feature data to be processed by the hardware accelerator 108. If there is still feature data to the process, then the flag 142 remains lowered (i.e., has a low value or other type of value). If the control logic 144 determines that there is no feature data remaining to be processed by the hardware accelerator 108, and the hardware accelerator 108 may raise a flag 142 (i.e., change the status of the flag, or change a value of the flag from low to high).

In one embodiment, when the flag 142 is raised, the epoch controller 112 may be alerted or may otherwise ascertain that it is time to reconfigure the hardware accelerator 108. The epoch controller 112 may write reconfiguration data to the register 134. This may correspond to overriding or updating the configuration data stored in the registers 134. The hardware accelerator 108 can include other components or configurations without departing from the scope of the present disclosure.

Figures 4A, 4B:
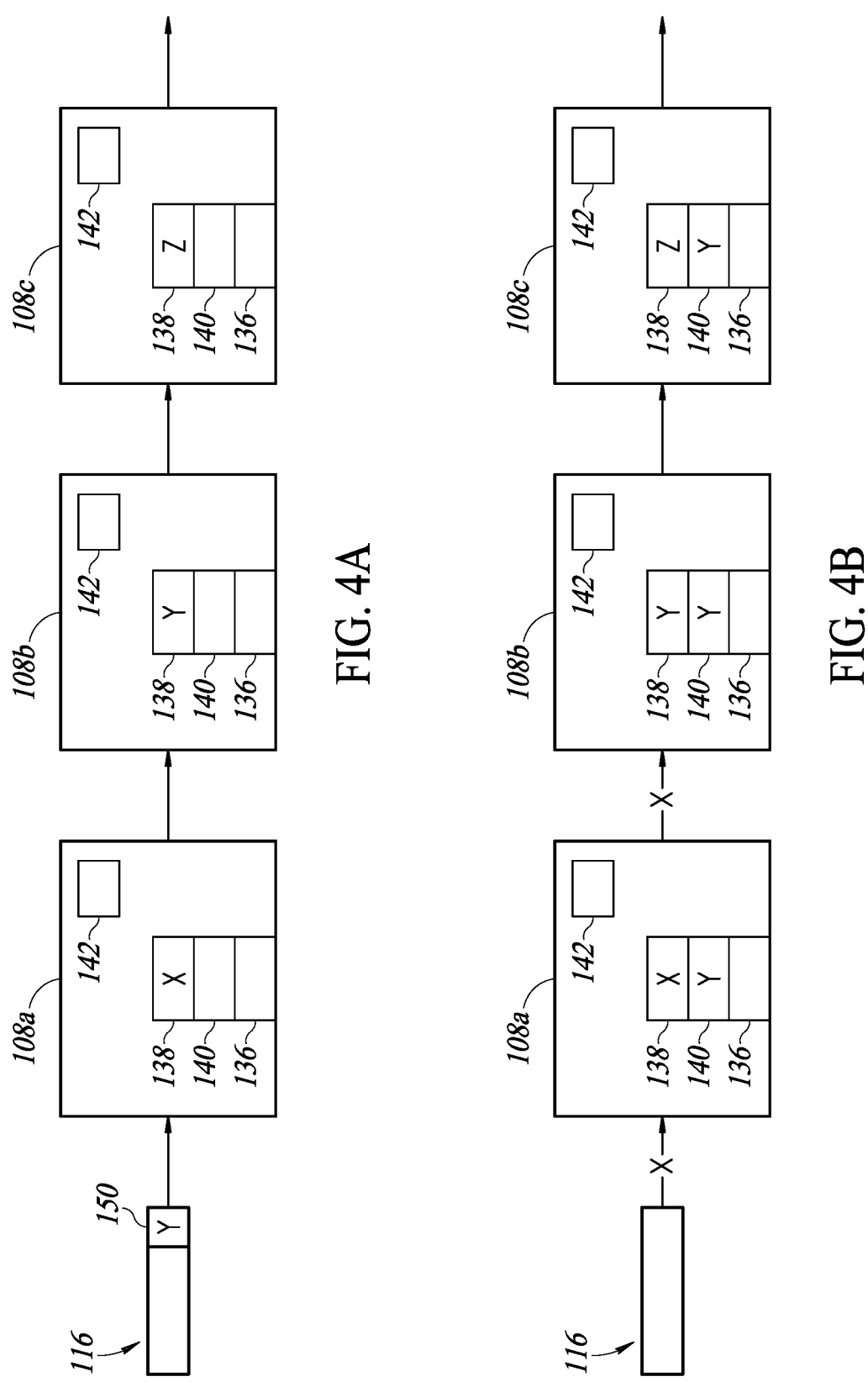
FIGS. 4A-4D illustrate data flow through a processing chain of a neural network, according to some embodiments.

FIGS. 4A-4D illustrate aspects of a reconfiguration process of a hardware accelerator 108 of a processing chain 120, in accordance with some embodiments. FIG. 4A illustrates three hardware accelerators 108a-108c. Each hardware accelerator 108 has registers 136, 138, and 140 that store the types of data described in relation to FIG. 3. In particular, a register 136 stores configuration data that controls the operation of the hardware accelerator 108. A register 138 stores identification data that is used in a matching process to initiate reconfiguration. A register 140 stores a reconfiguration tag after a reconfiguration tag is received in the stream of feature data 116.

In the example of FIG. 4A, the epoch controller 112 has written identification data X to the register 138 of the hardware accelerator 108a. The epoch controller has written identification data Y to the register 138 of the hardware accelerator 108b. The epoch controller 112 has written identification data Z to the register 138 of the hardware accelerator 108c. The respective identification data can assist in the reconfiguration process. In FIG. 4A, a reconfiguration tag 150 with value Y has been inserted into the stream of feature data 116 but has not yet been received by any of the hardware accelerators 108.

In FIG. 4B, the reconfiguration tag 150 has been received at the hardware accelerator 108a. The reconfiguration tag 150 with value Y has been written into the register 140 of the hardware accelerator 108a. The hardware accelerator 108a compares the reconfiguration tag in the register 140 to the identification data with value X in the register 138. Because the reconfiguration tag does not match the identification data for the hardware accelerator 108a, the reconfiguration process is not initiated.

In FIG. 4B, the reconfiguration tag 150 has been received at the hardware accelerator 108b. The reconfiguration tag with value Y has been written into the register 140 of the hardware accelerator 108b. The hardware accelerator 108b compares the reconfiguration tag in the register 140 to the identification data with value Y in the register 138. Because the reconfiguration tag matches the identification data for the hardware accelerator 108b, the reconfiguration process is initiated.

Upon initiation of the reconfiguration process, the operation of the hardware accelerator 108a is paused. Furthermore, the flow of feature data 116 into the processing chain 120 is also paused. The hardware accelerator 108b stops receiving feature data during the reconfiguration process.

The hardware accelerator 108b checks to see whether any feature data remains in the hardware accelerator 108b. Because there is still feature data remaining in the hardware accelerator 108b, the flag 142 is not raised. Instead the hardware accelerator 108b continues to process feature data and pass it to the hardware accelerator 108c until no more feature data remains in the hardware accelerator 108b. The hardware accelerator 108c, and any other hardware accelerators downstream from the hardware accelerator 108b continues to process feature data during the reconfiguration process such that feature data continues to flow through the processing chain downstream from the hardware accelerator 108b while reconfiguration takes place.

Figures 4C, 4D:
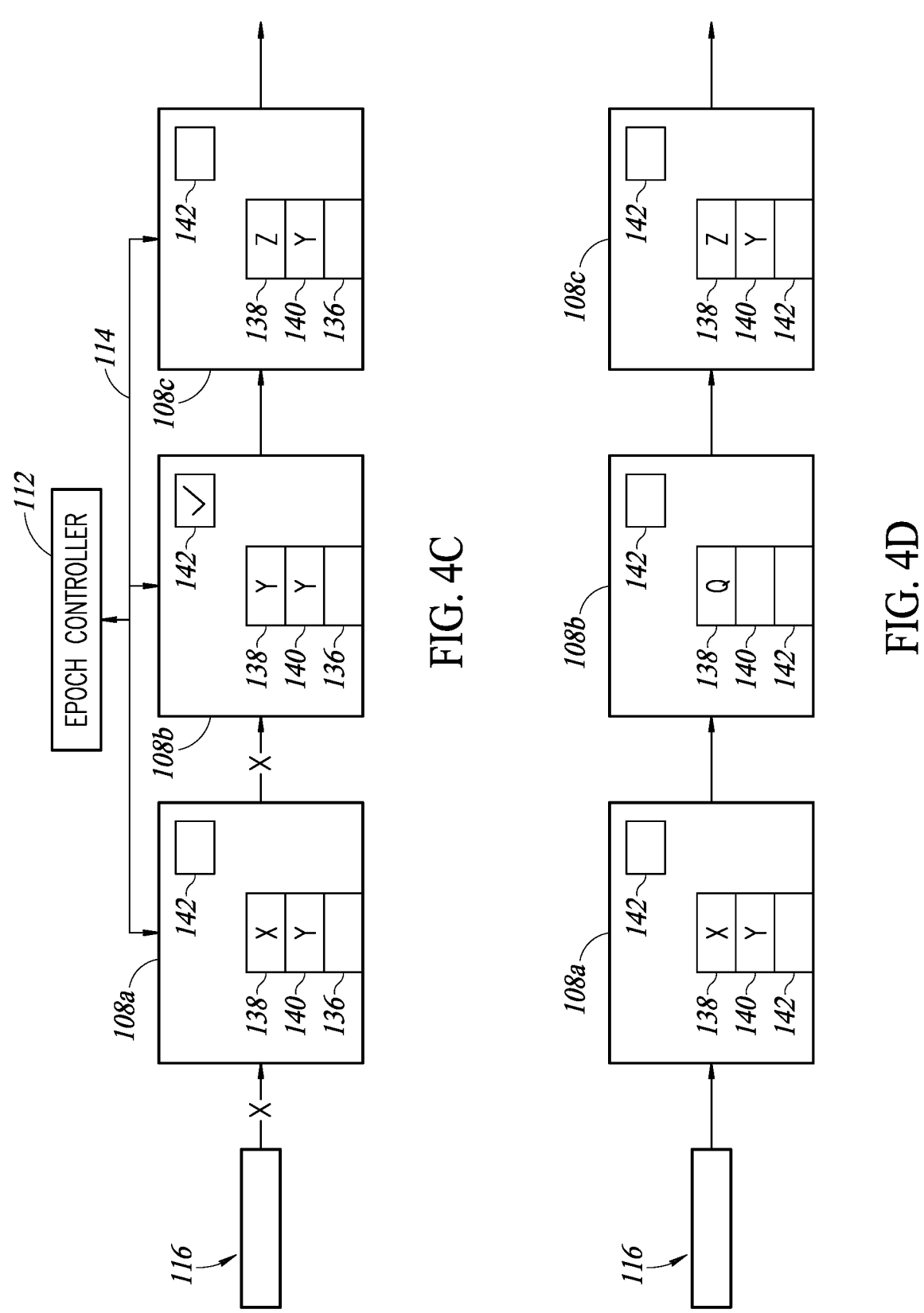

In FIG. 4C, all of the remaining feature data in the hardware accelerator 108b has been processed. Accordingly, the flag 142 has been raised. This signals to the epoch controller 112 that the hardware accelerator 108b is ready to be reconfigured. The epoch controller 112 then reconfigures the hardware accelerator 108b. This can be accomplished by writing reconfiguration data to the register 136 of the hardware accelerator 108b. This can correspond to overriding or adjusting the configuration data previously stored in the register 136. After reconfiguration of the hardware accelerator 108b, the epoch controller 112 causes the hardware accelerator 108a resume and the flow of feature data 116 into the hardware accelerator 108a to resume.

While FIG. 4C illustrates that the reconfiguration data 150 with value Y has been received at the register 140 of the hardware accelerator 108c, in practice, the hardware accelerator 108c may not receive the reconfiguration data 150 until after reconfiguration of the hardware accelerator 108b.

In FIG. 4D, the epoch controller 112 has written new identification data with value Q to the register 138 of the hardware accelerator 108b. The value Q can correspond to a value for a next reconfiguration process of the hardware accelerator 108b. In other words, the next reconfiguration process of the hardware accelerator 108b will occur when a reconfiguration tag 150 arrives with value Q.

In one embodiment, two or more hardware accelerators 108 may have the reconfiguration value Y in the identification data register 138. Accordingly, when reconfiguration data 150 passes through the processing chain 120, each hardware accelerator 108 that has the value Y will be successively reconfigured as the reconfiguration tag 150 with value Y is passed through the processing chain. In some embodiments every hardware accelerator 108 in the processing chain may have the same identification data such that all hardware accelerators 108 may be reconfigured upon reception of a same reconfiguration tag.

Figure 4E:
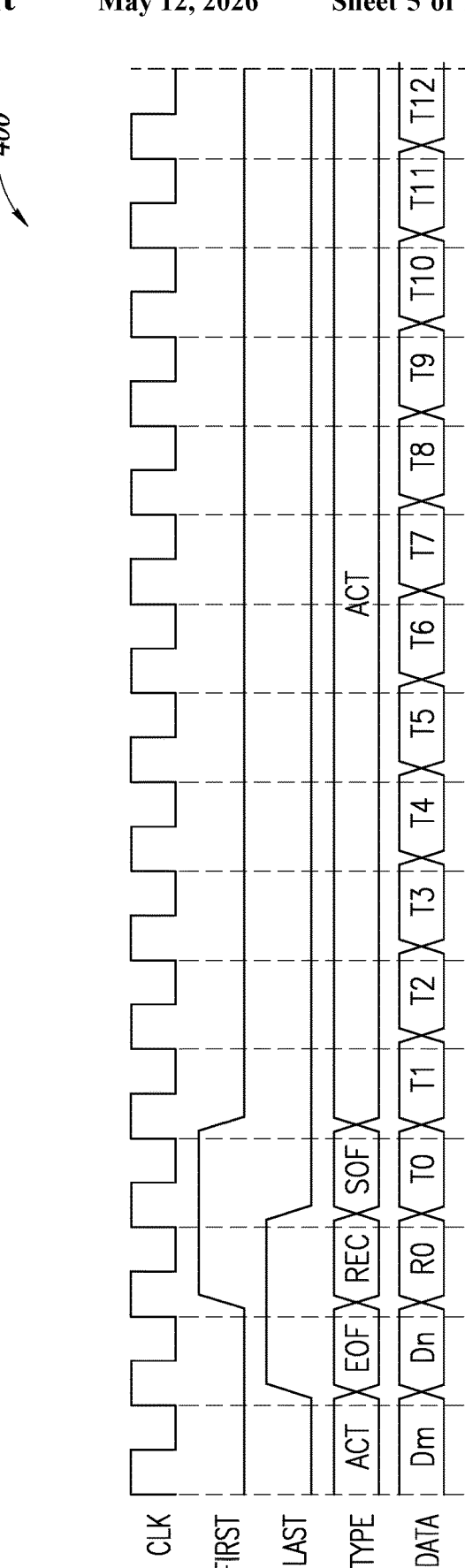
FIG. 4E is a timing diagram illustrating signals associated with the processing chain of FIGS. 4A-4D, according to some embodiments.

FIG. 4E is a timing diagram 400 illustrating signals associated with a processing chain of hardware accelerators 108, according to one embodiment. The signal CLK is a clock signal. The signal FIRST represents the beginning of a frame. The signal LAST represents the end of a frame. In one embodiment, each frame may correspond to a block 124 of tensor data 123 of the feature data 116.

DATA corresponds to the data packets of the stream of the feature data 116. LINETYPE corresponds to a type of a data packet in DATA. The type ACT corresponds to active data packets of the tensor data. The type EOF represents an end of frame data packet. The type SOF represents a start of frame data packet. The type REC represents a reconfiguration tag. Accordingly, the packet R0 in DATA corresponds to a reconfiguration packet inserted into the stream of feature data. Data packets Dx correspond to data of the first frame. Data packets Tx correspond to data of a second frame.

Figure 5A:
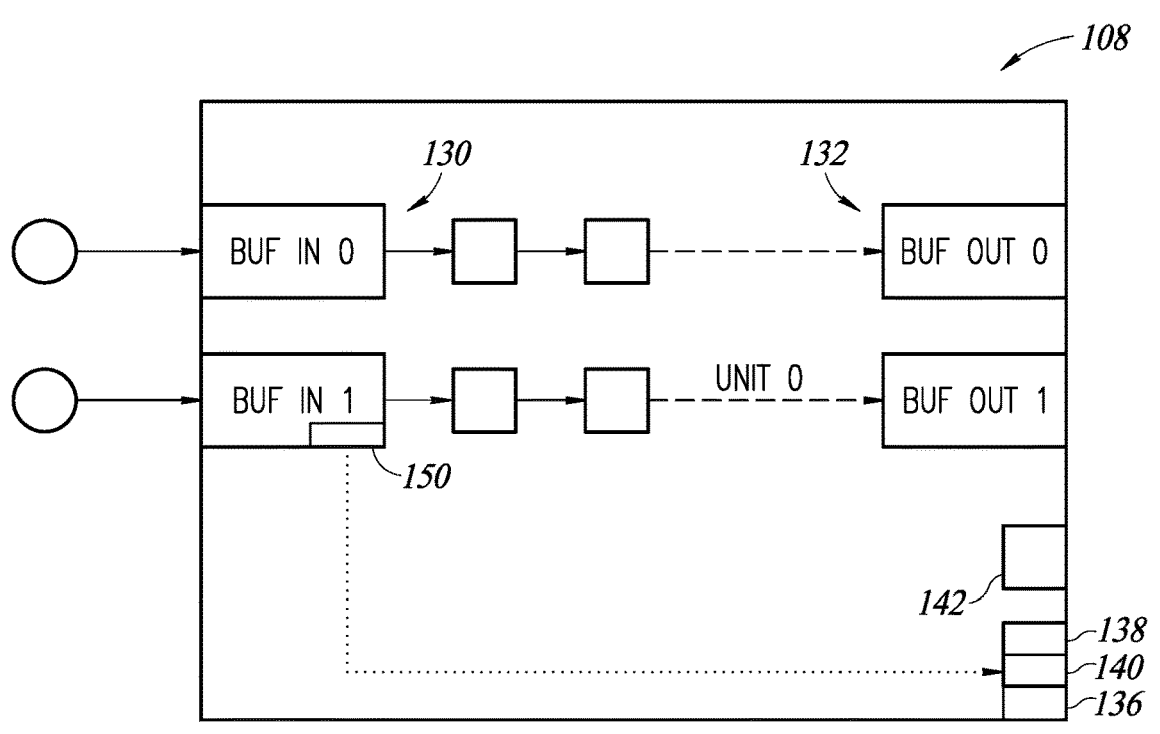
FIGS. 5A and 5B are block diagrams of a hardware accelerator of a neural network, according to some embodiments.

FIG. 5A is a block diagram of a hardware accelerator 108, in accordance with some embodiments. The hardware accelerator 108 includes two input channels each connected to an input buffer 130 and to output channels supplied from a corresponding output buffer 132. In the example of a convolution accelerator, a first input channel may correspond to feature data 116 and a second input channel may correspond to kernel data. In FIG. 5A, reconfiguration tag 150 is received at the input buffer 1. The reconfiguration tag 150 is stored in the register 140 and, based on the value of the reconfiguration tag 150 and the identification data stored in the register 138, a reconfiguration process may be initiated. Initially, the flag 142 is not raised.

The reconfiguration tag 150 can be received at either input port. In either case, the reconfiguration process can be initiated and the input of data into both of the ports can be paused until the reconfiguration process is complete.

Figure 5B:
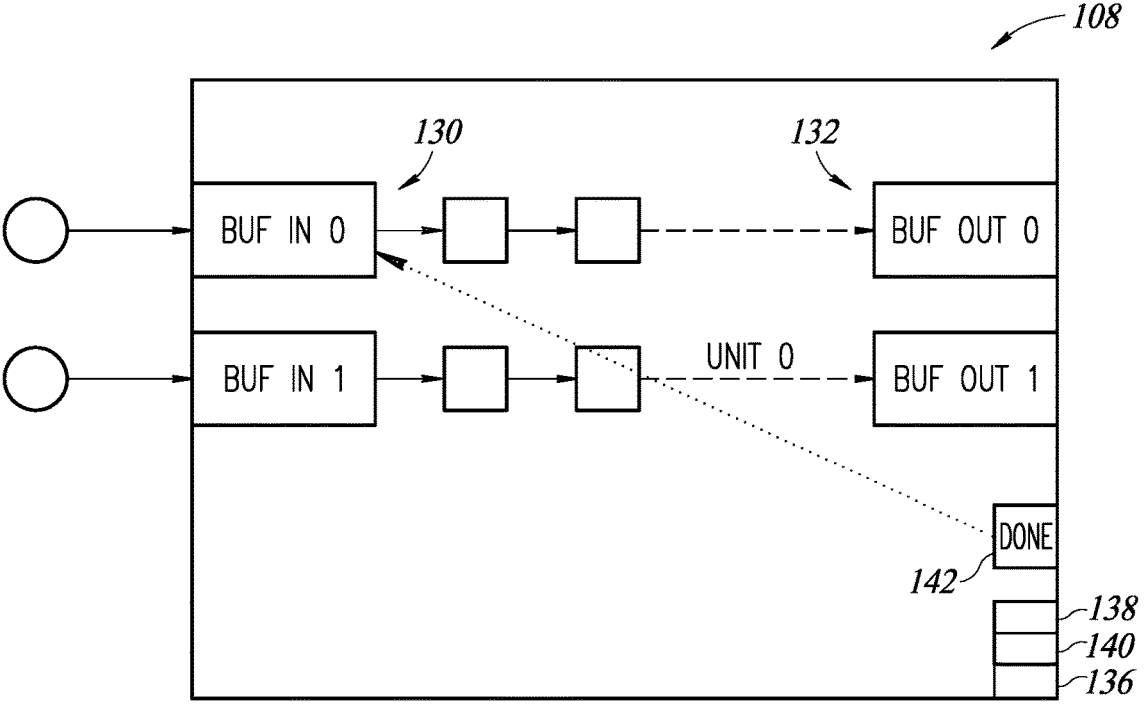

In FIG. 5B, the flag 142 has been raised. Reconfiguration of the hardware accelerator 108 can then be completed by the epoch controller 116.

Figure 6A:
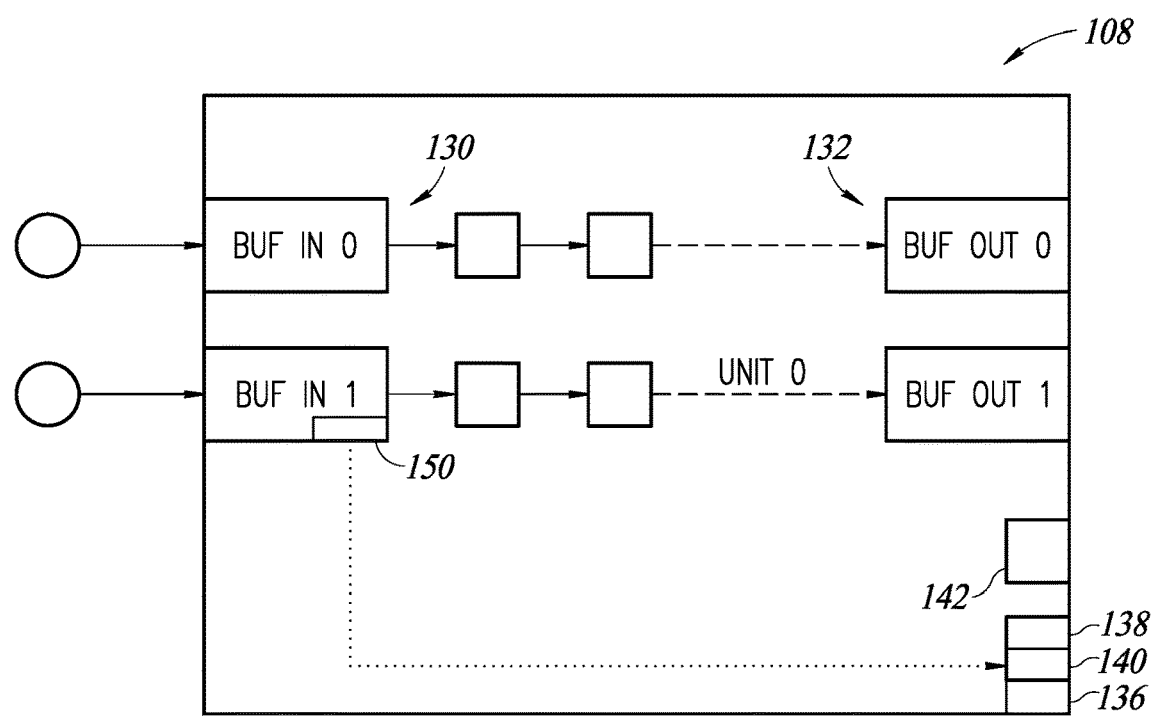
FIGS. 6A and 6B are block diagrams of a hardware accelerator of a neural network, according to some embodiments.

FIG. 6A is a block diagram of a hardware accelerator 108, in accordance with some embodiments. The hardware accelerator 108 includes two input channels each connected to an input buffer 130 and to output channels supplied from a corresponding output buffer 132. In the example of a convolution accelerator, a first input channel may correspond to feature data 116 and a second input channel may correspond to kernel data. In FIG. 5A, reconfiguration tag 150 is received at the input buffer 1. The reconfiguration tag 150 is stored in the register 140 and, based on the value of the reconfiguration tag 150 and the identification data stored in the register 138, a reconfiguration process may be initiated. Initially, the flag 142 is not raised.

The reconfiguration tag 150 can be received at either input port. In either case, the reconfiguration process can be initiated and the input of data into both of the ports can be paused until the reconfiguration process is complete.

Figure 6B:
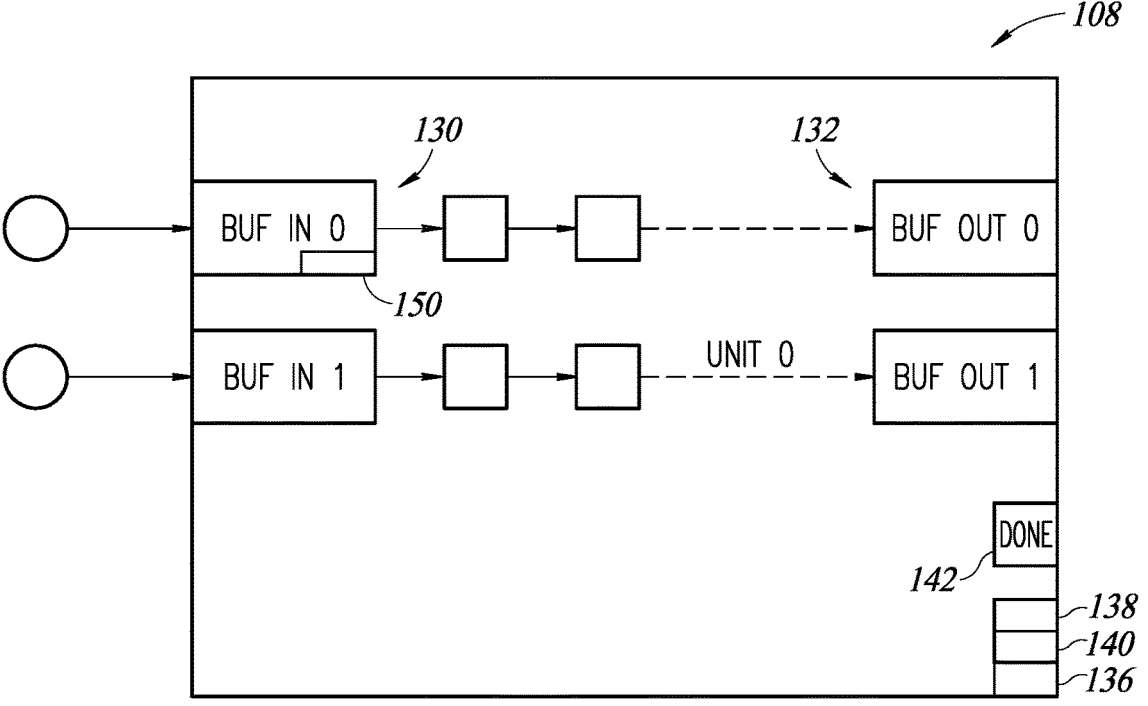

In FIG. 6B, the flag 142 has been raised. Reconfiguration of the hardware accelerator 108 can then be completed by the epoch controller 116. In FIG. 6B, a reconfiguration tag has been received at the input zero, which may or may not initiate another reconfiguration process.

Figure 7:
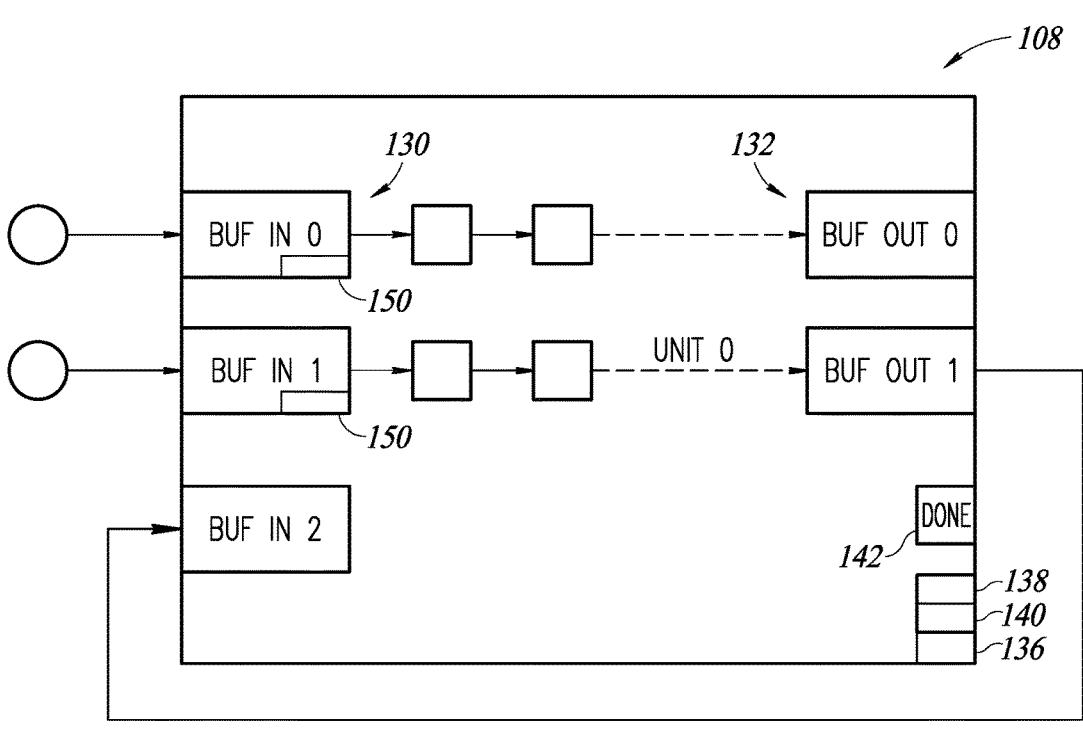
FIG. 7 is a block diagram of a hardware accelerator of the neural network, according to some embodiments.

FIG. 7 illustrates a hardware accelerator 108, according to one embodiment. In FIG. 7, there is a feedback input port coupled to an input buffer 130 (BUF IN 2) and receiving feedback from the output buffer 132 (BUF OUT 1). In this example, the feedback port 10 take into account any reconfiguration data. Reconfiguration may occur for input buffers 0 and 1, but not for buffer 2.

Figure 8:
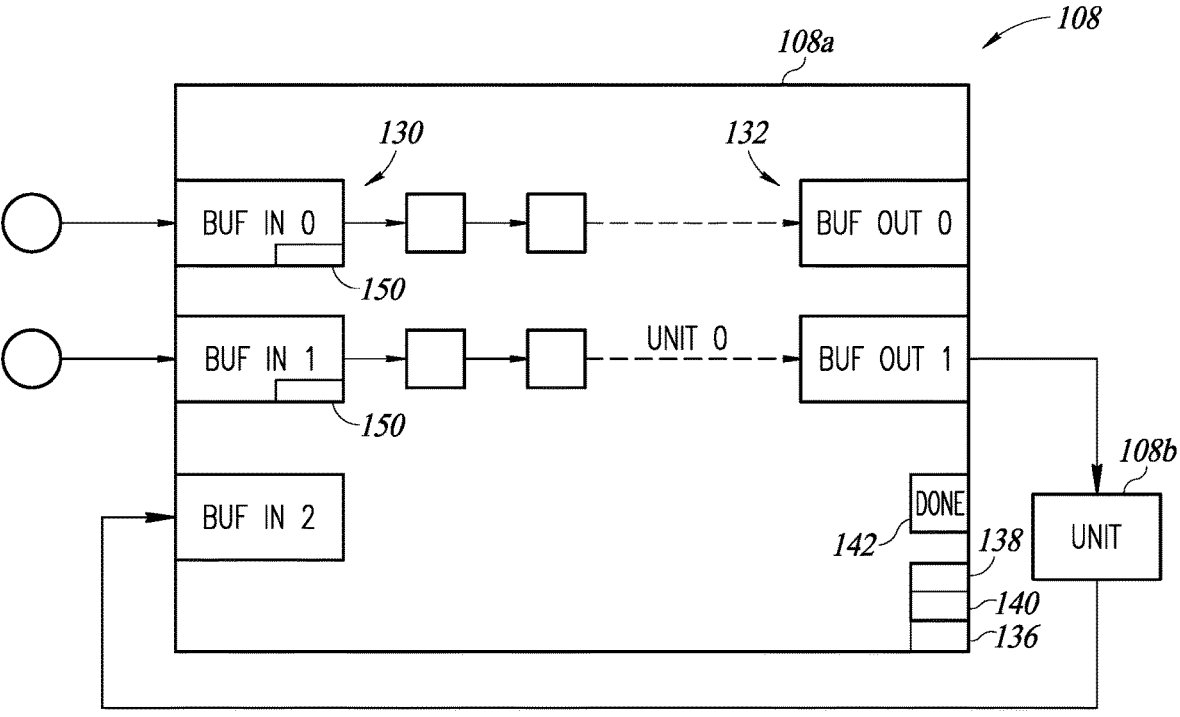
FIG. 8 is a block diagram of a hardware accelerator of the neural network, according to some embodiments.

FIG. 8 illustrates a first hardware accelerator 108 and the second hardware accelerator 108b, according to one embodiment. The hardware accelerator 108 is substantially similar to the hardware accelerator 108 of FIG. 7, except that the feedback input port BUF IN 2 receives feedback from the output of the hardware accelerator 108b. In this example, it may be established at each hardware accelerator has only one reconfiguration port. In particular input port 0 or 1 may be configured as reconfiguration port, but feedback input port 2 may not be utilized as a reconfiguration port.

FIGS. 9A-9D illustrate a processing chain of three hardware accelerators 108a-c at successive stages of a reconfiguration process, in accordance with some embodiments. The three hardware accelerators may be substantially identical to the hardware accelerators 108a-c of FIGS. 4A-4D, except that each hardware accelerator 108 includes a respective reconfiguration trigger 170. The reconfiguration trigger 170 may correspond to a trigger signal output from the hardware accelerator 108 to the epoch controller 112 via the bus 114.

Figures 9A, 9B:
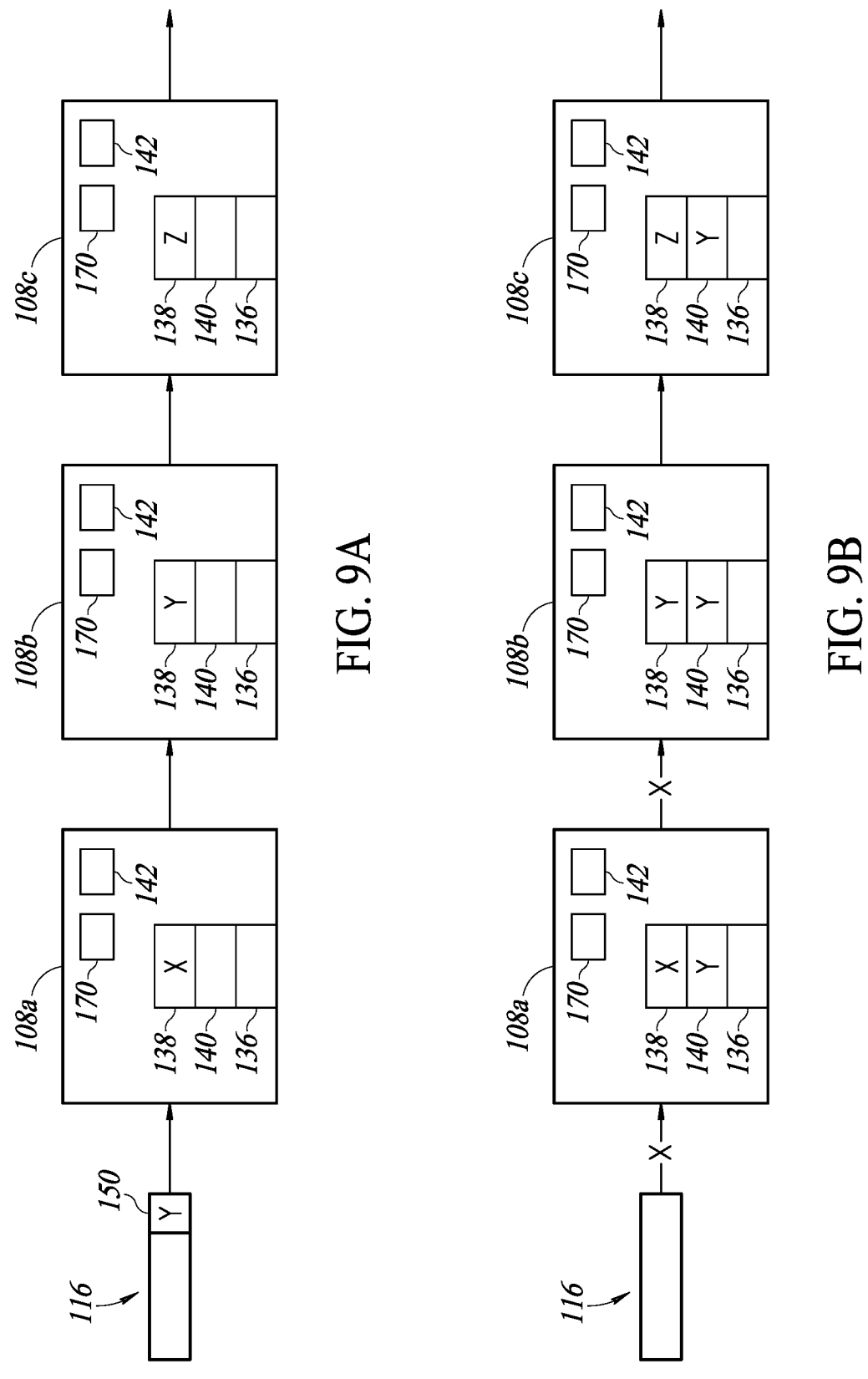
FIGS. 9A-9D illustrate data flow through a processing chain of a neural network, according to some embodiments.
Figures 9C, 9D:
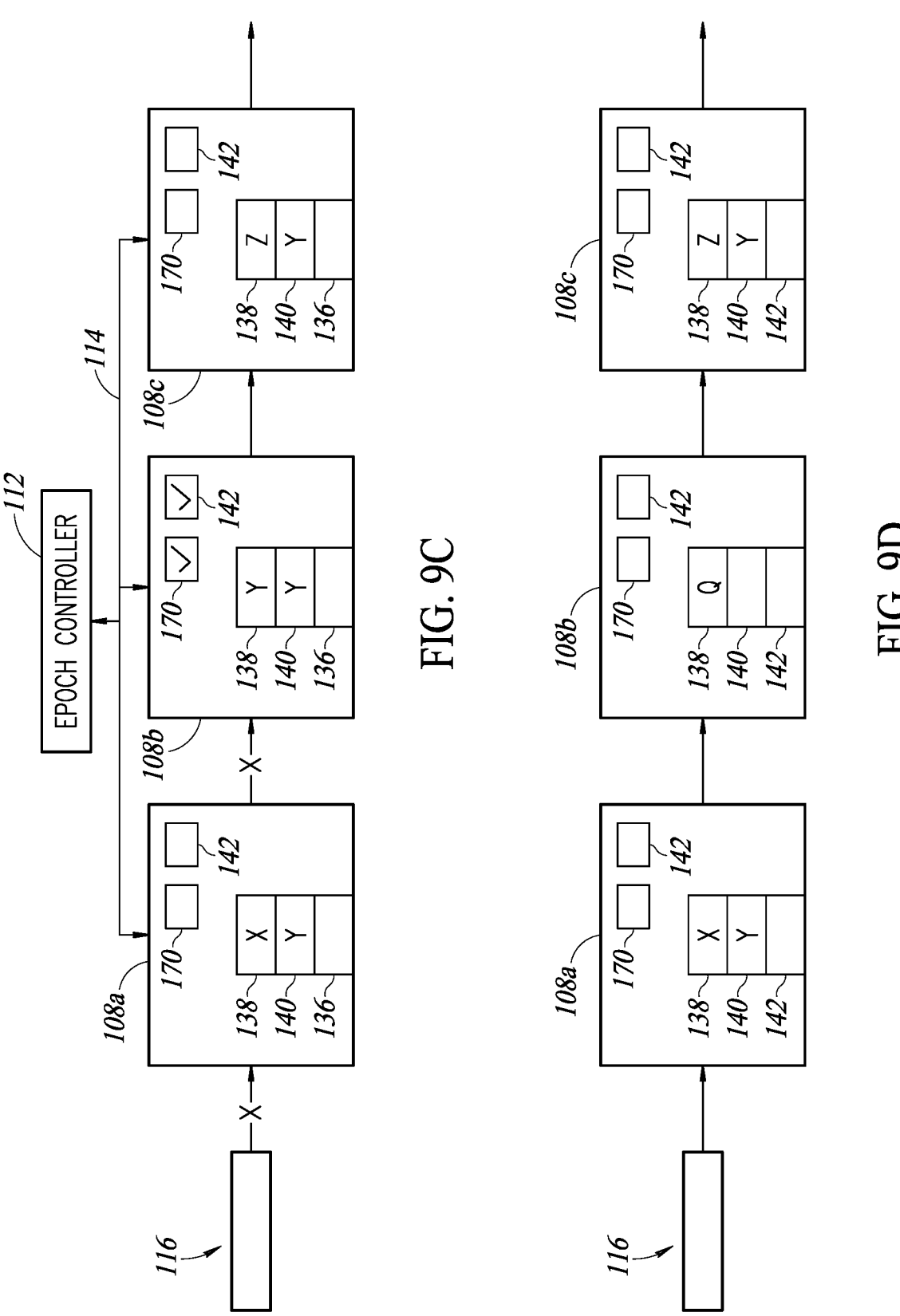

FIGS. 9A-9B illustrates the reception of a reconfiguration tag 150 with the feature data 116, and the initiation of a reconfiguration process for the hardware accelerator 108*b*, substantially similar to the process described in relation to FIGS. 4A and 4B. However, in FIG. 9C, reconfiguration by the epoch controller 112 will not begin until the trigger 170 is sent to the epoch controller 112 via the bus 114. Accordingly, when the flag 142 goes high and the hardware accelerator 108*b* is ready to be reconfigured, the hardware accelerator 108*b* will send a reconfiguration trigger signal to the epoch controller 112. Upon receiving the reconfiguration trigger signal, the epoch controller 112 reconfigures the hardware accelerator 108*b* via the bus 114, as described in relation to FIG. 4C.

FIGS. 10A-10D corresponds to a block diagram of a hardware accelerator 108 during the reconfiguration process, according to one embodiment. The reconfiguration process does not utilize the bus 114 of FIGS. 10A-10D. Instead, reconfiguration is accomplished entirely via the feature data stream.

Figure 10A:
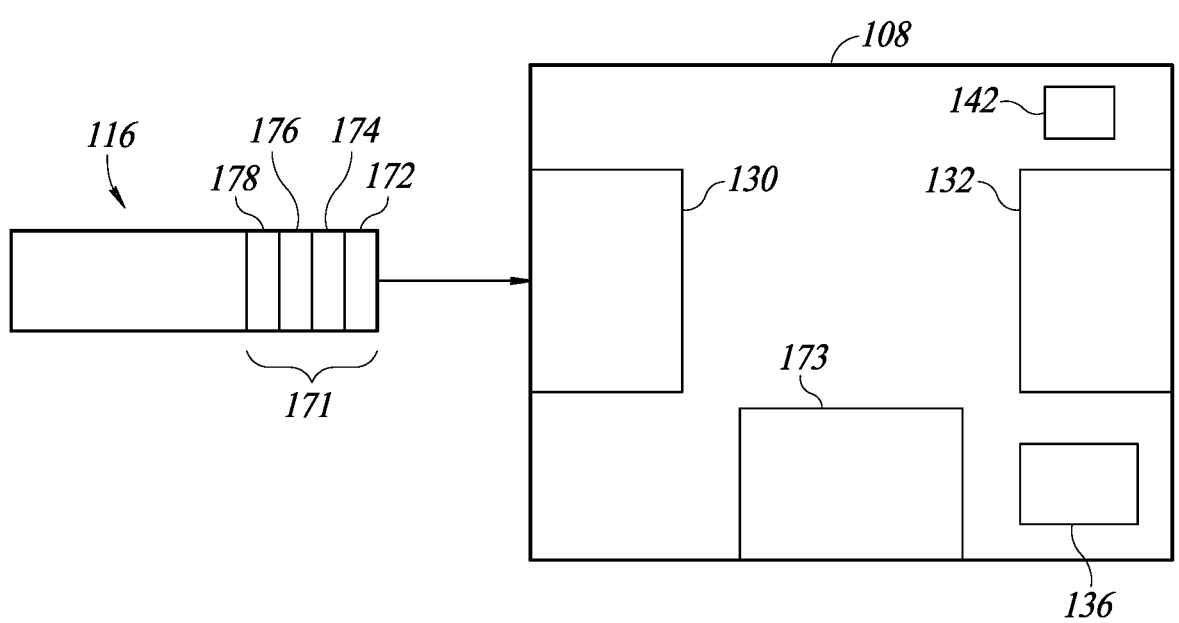
FIGS. 10A-10F illustrate data flow through a processing chain of a neural network, according to some embodiments.
Figure 10B:
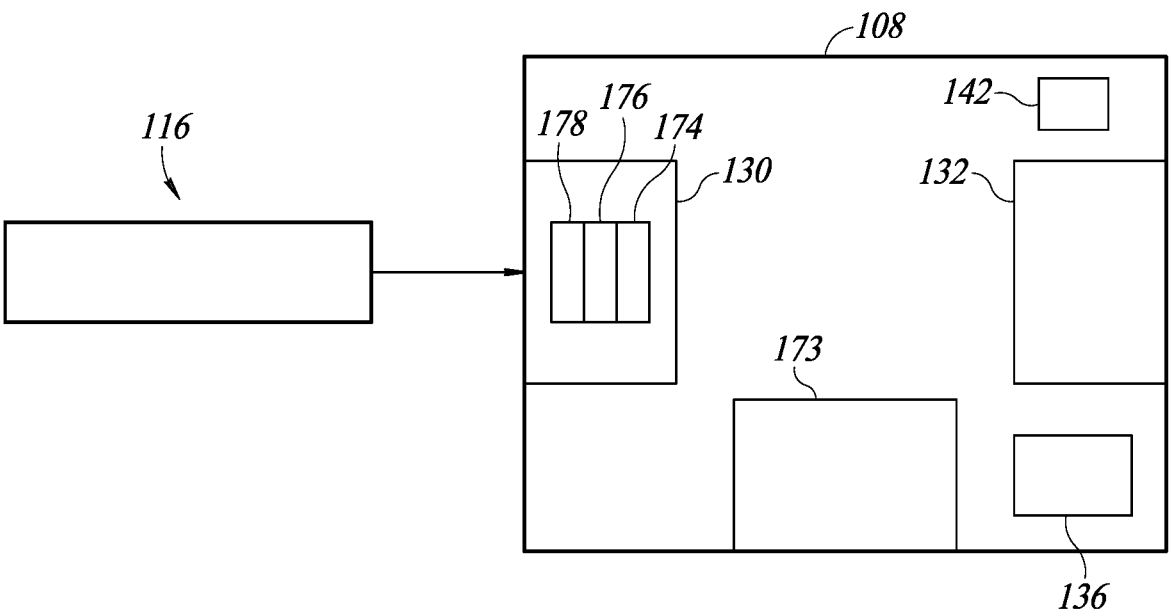
Figure 10C:
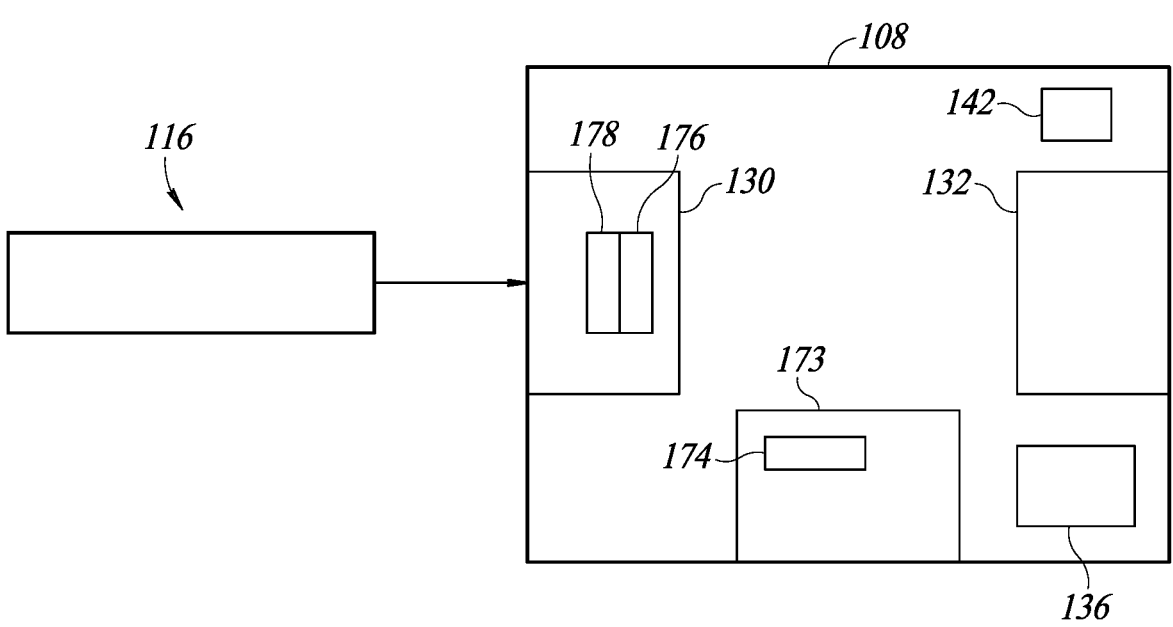
Figure 10D:
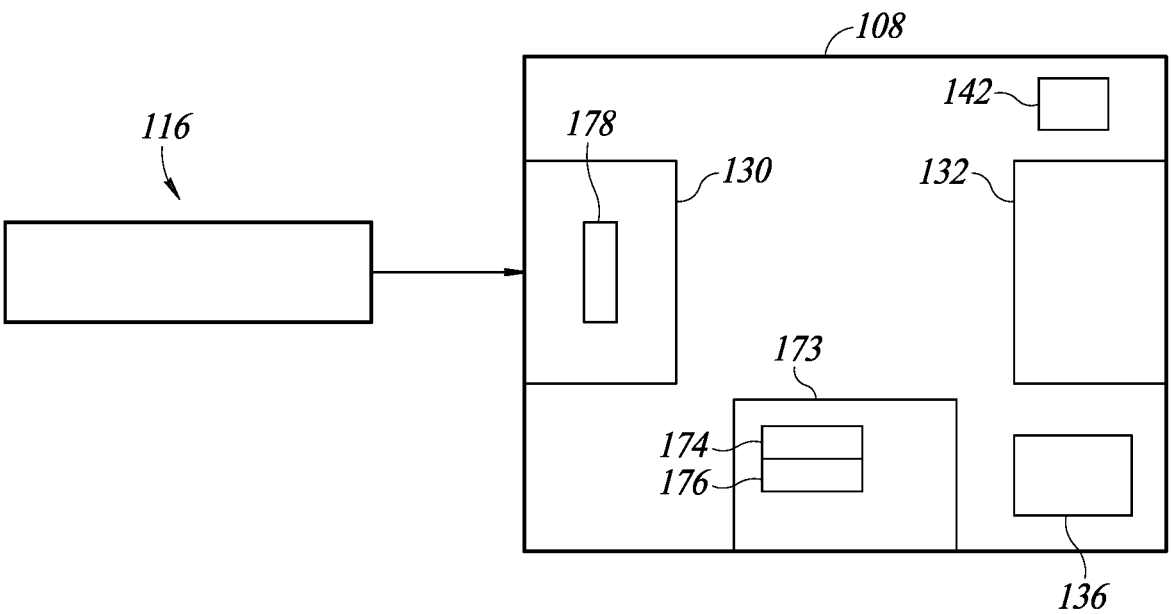
Figure 10E:
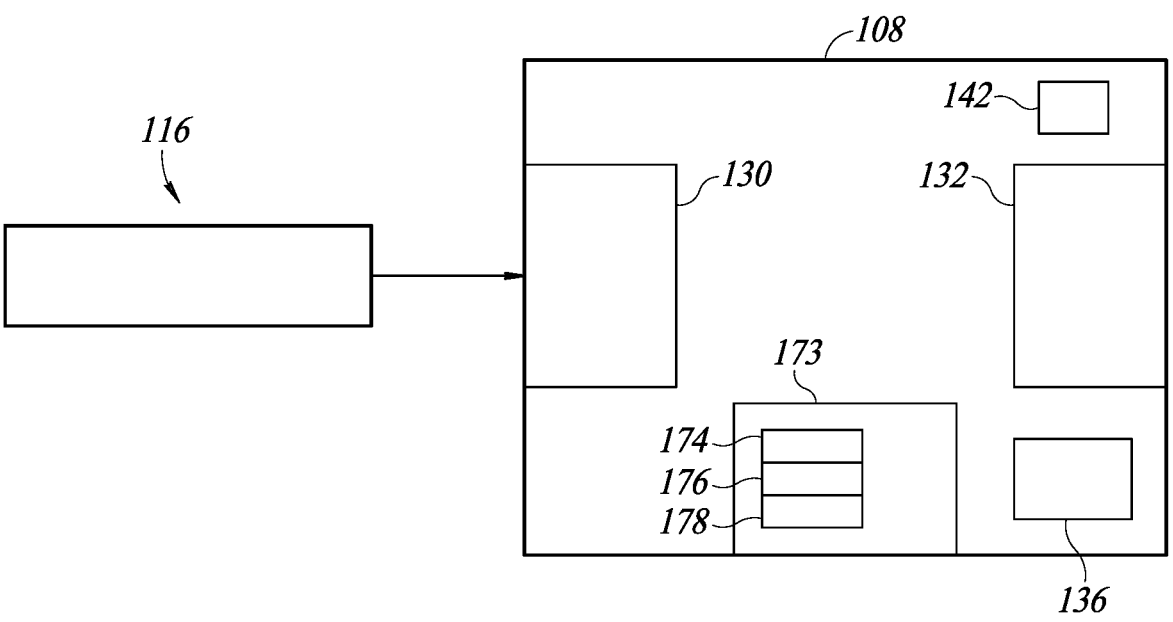

In FIG. 10A, reconfiguration packets 171 have been inserted into the stream of feature data 116. The reconfiguration packets 171 include a header 172, the unit identification 174, a register address 176, and reconfiguration data 178. The header may indicate a number of channels to be considered on the input and a number of channels to be considered on the output. The header 172 may also include a number of the reconfiguration bites. The unit identification 174 may indicate the identity of the hardware accelerator 108 to be reconfigured so that a hardware accelerator that receives the reconfiguration packets 171 may determine whether or not the reconfiguration packets 171 are meant for it. The register address 176 indicates the locations within the register 136 that will be rewritten. The reconfiguration data 178 includes the actual data to be written into the identified locations of the register 136. The hardware accelerator 108 includes additional registers 173 that may store the reconfiguration packets 173 as they arrive at the hardware accelerator 108.

Figure 10F:
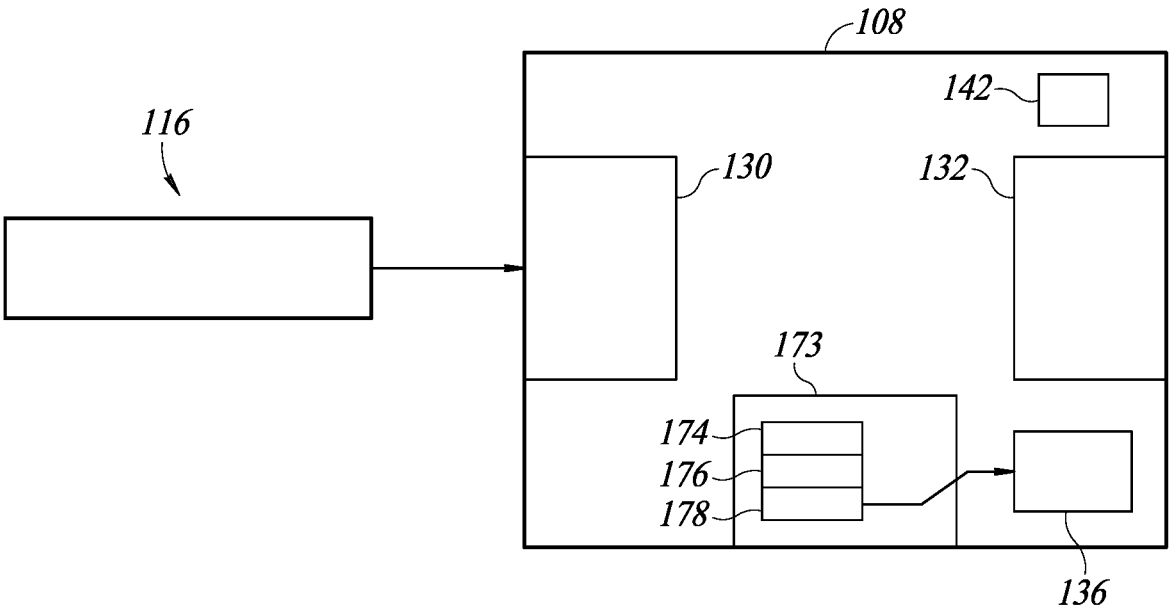

In FIG. 10B-10E, the reconfiguration packets 171 are written into the register 173 in successive clock cycles. In FIG. 10F, the reconfiguration data 178 is written into the register 136. In particular, the reconfiguration data 178 is written into the locations of the register 136 indicated by the register address 176.

Figures 10G, 10H:
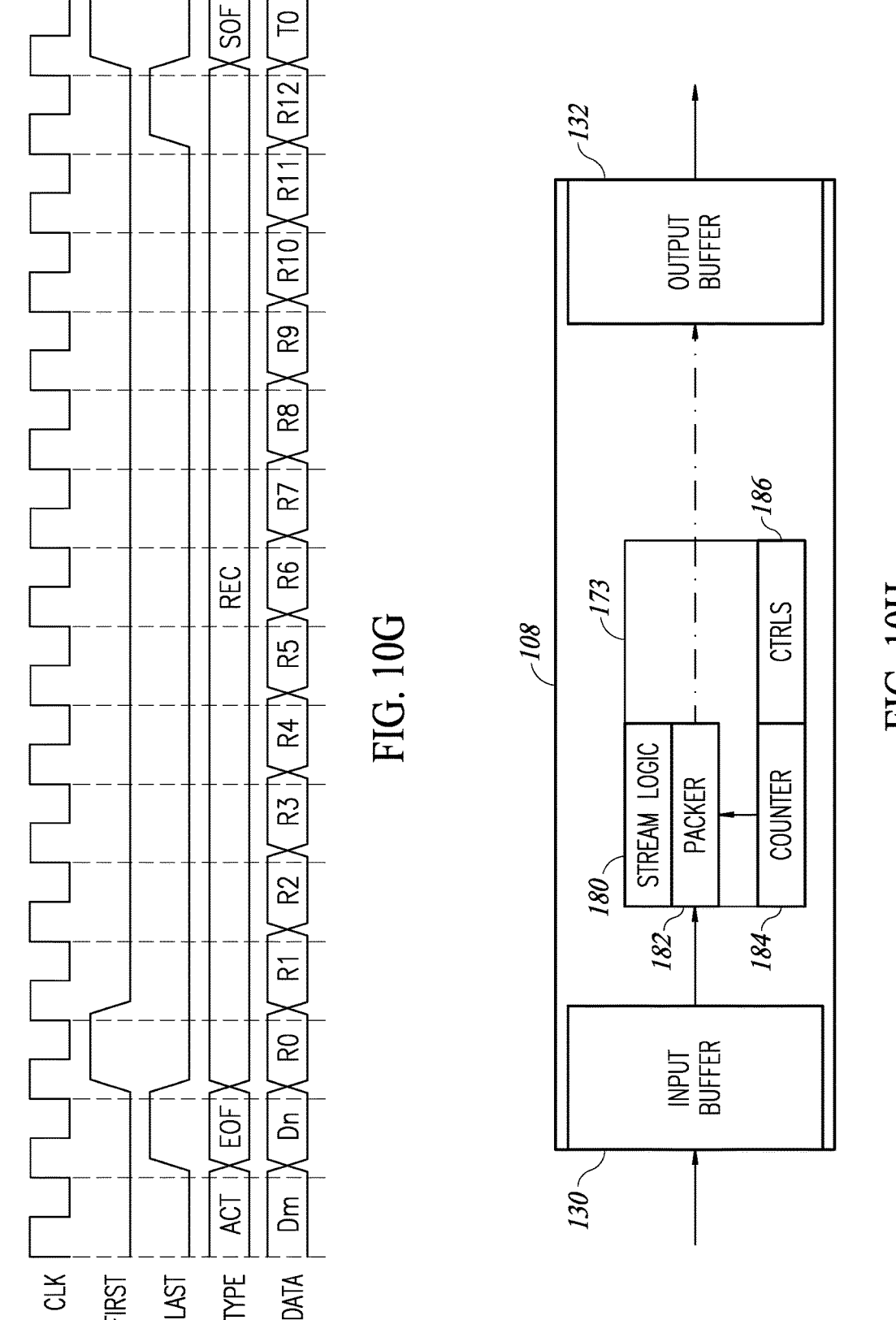
FIG. 10G is a timing diagram illustrating signals associated with the processing chain of FIGS. 10A-10F, according to some embodiments.
FIG. 10H is a block diagram of a hardware accelerator associated with FIGS. 10A-10G, according to some embodiments.

FIG. 10G is a timing diagram 1000 of signals associated with the reconfiguration process described in relation to FIGS. 10A-10E. The timing diagram 1000 of FIG. 10G is substantially similar, except that the duration of the reconfiguration packets are much longer. In particular, after the end of frame EOF of the D frame in which data packets Dx are received into the stream of feature data, the start SOF the reconfiguration frame begins in which the reconfiguration packets 171(Rx) are received across a plurality of clock cycles. After the end of the reconfiguration frame, the start of frame SOF of the T frame begins and packets Tx are received.

FIG. 10H is a block diagram that illustrates some of the registers 173 and other circuitry of the buffer one, in accordance with some embodiments. The registers 173 include stream logic 180, a packer 182, a counter 184, and controls 186. The packer 182 can be utilized for data adaptation. The stream logic 180 can be utilized to correct to carry out and separate the data. The counter 184 can be utilized to exploit commands, such as frame counts or other functionality.

In one embodiment, after the last transmission to write the configuration registers comes in it will be possible to start to write the data for the usual operation modes. In one embodiment, the reconfiguration will take place if and only if the previous processing has already ended, the same will be valid in the case of passing the data along a chain. For this reason, a sort of soft enable can be useful in these cases.

In one embodiment, a reset processing can be utilized before the reprogramming. In one embodiment, one or more of the hardware accelerators 108 could be reconfigured using just some of the available streams and not all of them. In these cases, it would be difficult to use one stream to reconfigure the data due to operations happening on the stream, to preserve it from reprogramming issues or to save some space and power consumption deriving from the interface instantiation.

In one embodiment, if there are two or more concurrent streams, it may need to stop all of the streams may need to be stopped, or at least stop the one driving the data flow and transmit the reconfiguration data on it. Otherwise, it would be difficult to obtain the correct data at the end of the processing due to mismatches arising when reconfiguring. These cases are easier to be considered since it is possible to limit the reconfiguration on just these streams and avoid sending these data on other ones, but it can be difficult to apply the methodology for all units, thereby calling for a tailored approach on the unit data processing. This this can lead to a constraint that that the streams on which the reconfiguration can take place must be a priori known.

In one embodiment, if all the streams are independent it is possible to reconfigure on all of them and to have a dedicated reconfiguration for each one of them, given they are not interfering with one another. Also, in this case it would be easier to consider a single stream dedicated to taking care of all the reconfiguration steps. This is to highlight that all the considerations about where and when insert these interfaces depends on the unit, of course, and could to be treated and addressed by the compiler before the streams are organized in this case.

Figure 11:
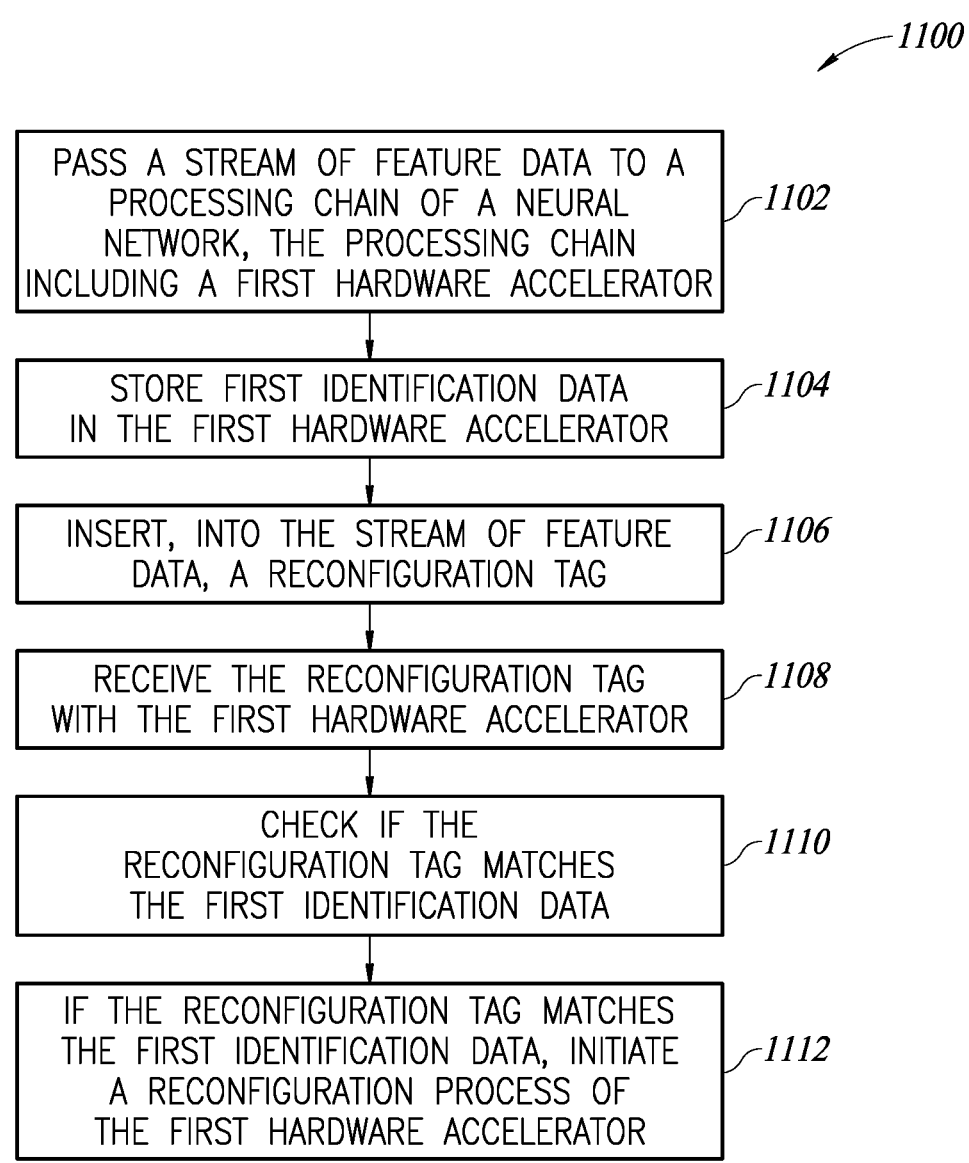
FIG. 11 is a flow diagram of a method for operating a neural network, according to some embodiments.

FIG. 11 is a flow diagram of a method 1100, according to some embodiments. The method 1100 can utilize systems, components, and processes described in relation to FIGS. 1-10H. At 1102, the method 1100 includes passing a stream of feature data to a processing chain of a neural network, the processing chain including a first hardware accelerator. At 1104, the method 1100 includes storing first identification data in the first hardware accelerator. At 1106, the method 1100 includes inserting, into the stream of feature data, a reconfiguration tag. At 1108, the method 1100 includes receiving the reconfiguration tag with the first hardware accelerator. At 1110, the method 1100 includes checking if the reconfiguration tag matches the first identification data. At 1112 the method 1100 includes if the reconfiguration tag matches the first identification data, initiating a reconfiguration process of the first hardware accelerator.

FIG. 12 is a flow diagram of a method 1200, according to some embodiments. The method 1200 can utilize systems, components, and processes described in relation to FIGS. 1-10H. At 1202, the method 1200 includes configuring a processing chain of a neural network, the processing chain including a first hardware accelerator, a second hardware accelerator downstream from the first hardware accelerator, and a third hardware accelerator downstream from the second hardware accelerator. At 1204, the method 1200 includes passing a stream of feature data to the processing chain. At 1206, the method 1200 includes inserting a reconfiguration tag into the stream of feature data. At 1208, the method 1200 includes receiving the reconfiguration tag at the second hardware accelerator. At 1210, the method 1200 includes comparing the reconfiguration tag to identification data stored in the second hardware accelerator. If the reconfiguration tag matches the identification data, then the method 1200 utilizes steps 1212, 1214, and 1216. At 1212, the method 1200 includes stopping the first hardware accelerator from passing the stream of feature data to the second hardware accelerator. At 1214, the method 1200 includes continuing to process the stream of feature data with the third hardware accelerator after stopping the first hardware accelerator. At 1216, the method 1200 includes reconfiguring the second hardware accelerator after stopping the first hardware accelerator.

Embodiments of the present disclosure provide a method and device that enables on-the-fly reconfiguration of hardware accelerators of a neural network. In one embodiment, while a processing chain of the neural network is operating, a reconfiguration tag is inserted into the stream of feature data being processed controller. Each of the hardware accelerators of the processing chain receives the reconfiguration tag in turn. If the reconfiguration tag matches an identifier stored in a hardware accelerator, then processing of feature data upstream from the matched hardware accelerator is paused while hardware accelerators downstream continue to process feature data already in the pipe. An epoch controller then reconfigures the matched hardware accelerator via bus separate from the chain. Flow of the feature data is then resumed. The result is that one or more of the hardware accelerators can be reconfigured on-the-fly without entirely emptying the processing chain of feature data.

In one embodiment, a method includes passing a stream of feature data to a processing chain of a neural network. The processing chain includes a first hardware accelerator. The method includes storing first identification data in the first hardware accelerator, inserting, into the stream of feature data, a reconfiguration tag, and receiving the reconfiguration tag with the first hardware accelerator. The method includes checking if the reconfiguration tag matches the first identification data and if the reconfiguration tag matches the first identification data, initiating a reconfiguration process of the first hardware accelerator.

In one embodiment, a method includes configuring a processing chain of a neural network. The processing chain includes a first hardware accelerator, a second hardware accelerator downstream from the first hardware accelerator, and a third hardware accelerator downstream from the second hardware accelerator. The method includes passing a stream of feature data to the processing chain, inserting a reconfiguration tag into the stream of feature data, receiving the reconfiguration tag at the second hardware accelerator, and comparing the reconfiguration tag to identification data stored in the second hardware accelerator. The method includes, if the reconfiguration tag matches the identification data, stopping the first hardware accelerator from passing the stream of feature data to the second hardware accelerator, continuing to process the stream of feature data with the third hardware accelerator after stopping the first hardware accelerator, and reconfiguring the second hardware accelerator after stopping the first hardware accelerator.

In one embodiment, a device includes a neural network. The neural network includes a stream switch, a plurality of hardware accelerators configured as a processing chain of the neural network in conjunction with the stream switch, and stream engine. The stream engine is configured to pass a stream of feature data to the plurality of hardware accelerators and to insert a reconfiguration tag into the stream of feature data. At least one of the hardware accelerators includes a register configured to store identification data, to compare the reconfiguration tag to the identification data, and to initiate a reconfiguration process of the at least one hardware accelerator if the reconfiguration tag matches the identification data.

Some embodiments may take the form of or comprise computer program products. For example, according to one embodiment there is provided a computer readable medium comprising a computer program adapted to perform one or more of the methods or functions described above. The medium may be a physical storage medium, such as for example a Read Only Memory (ROM) chip, or a disk such as a Digital Versatile Disk (DVD-ROM), Compact Disk (CD-ROM), a hard disk, a memory, a network, or a portable media article to be read by an appropriate drive or via an appropriate connection, including as encoded in one or more barcodes or other related codes stored on one or more such computer-readable mediums and being readable by an appropriate reader device.

Furthermore, in some embodiments, some or all of the methods and/or functionality may be implemented or provided in other manners, such as at least partially in firmware and/or hardware, including, but not limited to one or more application-specific integrated circuits (ASICs), digital signal processors, discrete circuitry, logic gates, standard integrated circuits, controllers (e.g., by executing appropriate instructions, and including microcontrollers and/or embedded controllers), field-programmable gate arrays (FPGAs), complex programmable logic devices (CPLDs), etc., as well as devices that employ RFID technology, and various combinations thereof.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method, comprising:
   passing a stream of feature data to a processing chain of a neural network, the processing chain including a first hardware accelerator;
   storing first identification data in the first hardware accelerator;
   inserting, into the stream of feature data, a reconfiguration tag;
   receiving the reconfiguration tag with the first hardware accelerator;
   checking if the reconfiguration tag matches the first identification data;
   and detecting that the reconfiguration tag matches the first identification data, and upon the detecting, initiating a reconfiguration process of the first hardware accelerator.

2. The method of claim 1, wherein the reconfiguration process includes stopping reception of the stream of feature data at an input of the first hardware accelerator.

3. The method of claim 2, wherein the reconfiguration process includes, after stopping reception of the stream of feature data, continuing to output from the first hardware accelerator feature data received by the hardware accelerator prior to initiating the reconfiguration process.

4. The method of claim 3, wherein the reconfiguration process includes raising a flag indicating that all previously received feature data has been output from the first hardware accelerator.

5. The method of claim 4, wherein the reconfiguration process includes reconfiguring the first hardware accelerator in response to the flag.

6. The method of claim 5, wherein reconfiguring the first hardware accelerator includes writing reconfiguration data to a configuration register of the first hardware accelerator.

7. The method of claim 6, comprising writing the reconfiguration data via a bus separate from the processing chain.

8. The method of claim 7, comprising writing reconfiguration data with an epoch controller of the neural network.

9. The method of claim 5, comprising:

resuming reception of the stream of feature data at the first hardware accelerator after the reconfiguration process; and passing, from the first hardware accelerator, the reconfiguration tag to a second hardware accelerator of the processing chain.

10. The method of claim 9, comprising:

storing second identification data in the second hardware accelerator;

receiving the reconfiguration tag in the stream of feature data from the first hardware accelerator with the second hardware accelerator;

checking if the reconfiguration tag matches the second identification data; and if the reconfiguration tag matches the matches second identification data, initiating a reconfiguration process of the second hardware accelerator.

11. The method of claim 10, wherein the reconfiguration process includes:

stopping reception of the stream of feature data at an input of the first hardware accelerator;

after stopping reception of the stream of feature data, continuing to output from the second hardware accelerator feature data received by the second hardware accelerator prior to initiating the reconfiguration process of the second hardware accelerator;

raising a second flag indicating that all previously received feature data has been output from the second hardware accelerator; and reconfiguring the second hardware accelerator in response to the second flag.

12. The method of claim 1, comprising storing the first identification data in a read-only register of the first hardware accelerator.

13. The method of claim 1, comprising storing the first identification data in a rewritable register of the first hardware accelerator.

14. A method, comprising:

configuring a processing chain of a neural network, the processing chain including a first hardware accelerator, a second hardware accelerator downstream from the first hardware accelerator, and a third hardware accelerator downstream from the second hardware accelerator;

passing a stream of feature data to the processing chain;

inserting a reconfiguration tag into the stream of feature data;

receiving the reconfiguration tag at the second hardware accelerator;

comparing the reconfiguration tag to identification data stored in the second hardware accelerator;

and detecting that the reconfiguration tag matches the identification data, and upon the detecting:

stopping the first hardware accelerator from passing the stream of feature data to the second hardware accelerator;

continuing to process the stream of feature data with the third hardware accelerator after stopping the first hardware accelerator; and reconfiguring the second hardware accelerator after stopping the first hardware accelerator.

15. The method of claim 14, comprising resuming passing the stream of feature data from the first hardware accelerator to the second hardware accelerator after reconfiguring the second hardware accelerator.

16. The method of claim 15, wherein inserting the reconfiguration tag into the stream of feature data includes inserting the reconfiguration tag directly between an end of frame signal and a start of frame signal.

17. A device, comprising a neural network, the neural network including:

a stream switch;

a plurality of hardware accelerators configured as a processing chain of the neural network in conjunction with the stream switch; and a stream engine configured to pass a stream of feature data to the plurality of hardware accelerators and to insert a reconfiguration tag into the stream of feature data, wherein at least one of the hardware accelerators includes a register configured to store identification data, to compare the reconfiguration tag to the identification data, and to initiate a reconfiguration process of the at least one hardware accelerator if the reconfiguration tag matches the identification data.

18. The device of claim 17, wherein the neural network includes an epoch controller configured to reconfigure the at least one register in response to the reconfiguration tag matching the identification data.

19. The device of claim 17, wherein the at least one hardware accelerator is a convolutional accelerator.

20. The device of claim 17, wherein the at least one hardware accelerator is a pooling unit.

* * * * *